United States Patent
Wilson et al.

(10) Patent No.: US 10,773,361 B2
(45) Date of Patent: *Sep. 15, 2020

(54) SYSTEMS AND METHODS FOR MAKING ABRASIVE ARTICLES

(71) Applicant: 3M INNOVATIVE PROPERTIES COMPANY, St. Paul, MN (US)

(72) Inventors: Geoffrey I. Wilson, Woodbury, MN (US); Mark R. Nyberg, Alexandria, MN (US); Jeffery S. Thomford, Mahtomedi, MN (US); Ernest L. Thurber, Somerset, WI (US); Brian G. Koethe, Cottage Grove, MN (US); Charles C. Drange, St. Paul, MN (US); Robert J. Hnatyk, Woodbury, MN (US); John T. Boden, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 408 days.

This patent is subject to a terminal disclaimer.

(21) Appl. No.: 15/735,644

(22) PCT Filed: Jun. 15, 2016

(86) PCT No.: PCT/US2016/037480
§ 371 (c)(1),
(2) Date: Dec. 12, 2017

(87) PCT Pub. No.: WO2016/205267
PCT Pub. Date: Dec. 22, 2016

(65) Prior Publication Data
US 2018/0318983 A1   Nov. 8, 2018

Related U.S. Application Data

(60) Provisional application No. 62/182,077, filed on Jun. 19, 2015.

(51) Int. Cl.
*B24B 1/00* (2006.01)
*B24D 11/00* (2006.01)
(Continued)

(52) U.S. Cl.
CPC ............... *B24D 11/02* (2013.01); *B24D 3/30* (2013.01); *B24D 3/346* (2013.01); *B24D 11/00* (2013.01);
(Continued)

(58) Field of Classification Search
USPC .................................. 51/293, 295, 307, 309
See application file for complete search history.

(56) References Cited

U.S. PATENT DOCUMENTS 1,857,340 A * 5/1932 Wyatt ................. B24D 11/005
51/295
8,262,758 B2 * 9/2012 Gao ....................... B24D 18/00
51/309

(Continued)

FOREIGN PATENT DOCUMENTS

DE           2318074        10/1974
DE     10 2013 212609       12/2014
(Continued)

OTHER PUBLICATIONS

International Search Report for PCT/US2016/037480 dated Sep. 28, 2016, (3 pages).

*Primary Examiner* — James E McDonough
(74) *Attorney, Agent, or Firm* — Aleksander Medved

(57) ABSTRACT

Methods of making an abrasive article. Abrasive particles are loaded to a distribution tool including a plurality of walls defining a plurality of slots. Each slot is open to a lower side of the tool. The loaded particles are distributed from the distribution tool to a major face of a backing web below the lower side and moving relative to the tool. At least a majority (Continued)

of the particles distributed from the tool undergo an orientation sequence in which each particle first enters one of the slots. The particle then passes partially through the slot such that a first portion is beyond the lower side and in contact with the major face, and a second portion within the slot. The sequence then includes the particle remaining in simultaneous contact with one of the walls and the major face for a dwell period while the web moves relative to the tool.

16 Claims, 16 Drawing Sheets

(51) Int. Cl.
  *B24D 18/00* (2006.01)
  *B24D 11/02* (2006.01)
  *B24D 3/30* (2006.01)
  *B24D 3/34* (2006.01)
  *B24D 11/08* (2006.01)
  *B24D 3/00* (2006.01)
  *C09K 3/14* (2006.01)

(52) U.S. Cl.
  CPC ............ *B24D 11/005* (2013.01); *B24D 11/08* (2013.01); *B24D 18/00* (2013.01); *B24D 18/0072* (2013.01); *B24D 2203/00* (2013.01); *C09K 3/1409* (2013.01); *C09K 3/1436* (2013.01)

(56) References Cited

U.S. PATENT DOCUMENTS

| | | |
|---|---|---|
| 2003/0009949 A1 | 1/2003 | Prichard |
| 2003/0207659 A1 | 11/2003 | Annen |
| 2006/0254154 A1* | 11/2006 | Huang .................. B24B 7/228 51/293 |
| 2006/0288647 A1 | 12/2006 | Thurber |
| 2007/0044384 A1 | 3/2007 | Larson |
| 2008/0102720 A1 | 5/2008 | Rostal |
| 2008/0152856 A1 | 6/2008 | Keipert |
| 2009/0169816 A1 | 7/2009 | Erickson |
| 2009/0325466 A1 | 12/2009 | Kincaid |
| 2010/0146867 A1 | 6/2010 | Boden |
| 2010/0151196 A1 | 6/2010 | Adefris |
| 2010/0319269 A1 | 12/2010 | Erickson |
| 2011/0289854 A1 | 12/2011 | Moren |
| 2012/0227333 A1 | 9/2012 | Adefris |
| 2013/0040537 A1 | 2/2013 | Schwabel |
| 2013/0125477 A1 | 5/2013 | Adefris |
| 2013/0344786 A1 | 12/2013 | Keipert |
| 2014/0000176 A1 | 1/2014 | Moren |
| 2014/0106126 A1* | 4/2014 | Gaeta ................ B24D 18/0072 428/143 |
| 2014/0290147 A1 | 10/2014 | Seth |

FOREIGN PATENT DOCUMENTS

| | | |
|---|---|---|
| DE | 10 2013 212684 | 12/2014 |
| WO | WO 2010/077519 | 7/2010 |

* cited by examiner

SYSTEMS AND METHODS FOR MAKING ABRASIVE ARTICLES

CROSS REFERENCE TO RELATED APPLICATIONS

This application is a national stage filing under 35 U.S.C. 371 of PCT/US2016/037480, filed Jun. 15, 2016, which claims the benefit of U.S. Provisional Patent Application No. 62/182,077, filed Jun. 19, 2015, the disclosures of which are incorporated by reference in their entirety herein.

BACKGROUND

The present disclosure relates to abrasive articles. More particularly, it relates to tools, systems and methods for arranging abrasive particles on a backing as part of the manufacture of an abrasive article.

In general, coated abrasive articles have an abrasive layer secured to a backing. The abrasive layer comprises abrasive particles and a binder that secures the abrasive particles to the backing. One common type of coated abrasive article has an abrasive layer comprised of a make coat or layer, a size coat or layer, and abrasive particles. In making such a coated abrasive article, a make layer precursor comprising a curable make resin is applied to a major surface of the backing. Abrasive particles are then at least partially embedded into the curable make resin, and the curable make resin is at least partially cured to adhere the abrasive particles to the major surface of the backing. A size layer precursor comprising a curable size resin is then applied over the at least partially cured curable make resin and abrasive particles, followed by curing of the curable size resin precursor, and optionally further curing of the curable make resin.

Application of the abrasive particles to a major face of a backing construction (e.g., a backing coated with a make layer precursor) is oftentimes accomplished via drop coating technique in which a bulk supply of the abrasive particles are fed through a hopper and fall onto the major face (e.g., onto or into the make layer precursor) under the force of gravity. A spatial orientation of the abrasive particles upon contacting the major face is entirely random in all directions. Alternatively, electrostatic coating (e-coat) is also well known, and generally employs an electrostatic field to propel the abrasive particles vertically against the force of gravity onto the major face (e.g., onto or into the make layer precursor). With electrostatic coating, it is possible to effect the orientation of the abrasive particles in one direction such that each abrasive particle's elongated dimension is substantially erect (standing up) with respect to the backing surface. However, electrostatic coating is more expensive than drop coating, and may not be viable with all types of abrasive particles (e.g., it can be difficult to consistently electrostatically coat relatively large abrasive particles).

In light of the above, a need exists for improved systems and methods for applying abrasive particles to a backing construction as part of the manufacture of an abrasive article.

SUMMARY

Some aspects of the present disclosure are directed toward a method of making an abrasive article. The method includes loading abrasive particles to a distribution tool. The distribution tool includes a plurality of walls defining a plurality of slots. Each of the slots is open to a lower side of the distribution tool. The loaded abrasive particles are distributed from the distribution tool on to a major face of a backing construction web located immediately below the lower side and moving relative to the distribution tool. At least a majority of the abrasive particles distributed from the distribution tool undergo a particle orientation sequence in which each particle first enters one of the slots. The particle then passes partially through the corresponding slot such that a first portion of the abrasive particle is beyond the lower side and in contact with the major face, and a second portion of the abrasive particle is within the slot. The particle orientation sequence then includes the abrasive particle remaining in simultaneous contact with at least one of the walls and the major face for a dwell period during which the backing construction web moves relative to the distribution tool. In some embodiments, the method includes a plurality of the abrasive particles being simultaneously located within, and grossly aligned relative to, a respective one of the slots. In other embodiments, the orientation sequence includes the abrasive particle experiencing a natural re-orientation (e.g., tilting) following initial contact with the major face and while the second portion is within the confines of the corresponding slot. In yet other embodiments, the slot width is less than a nominal height and nominal length of the abrasive particles, but is greater than a nominal thickness.

Other aspects of the present disclosure are directed toward a system for making an abrasive article. The system includes a distribution tool and a web feeding device. The distribution tool includes a plurality of walls defining a plurality of slots. Each of the slots is open to a lower side of the distribution tool. The web feeding device is configured to manipulating a backing construction web in a machine direction immediately below the lower side of the distribution tool. Each of the slots defines a length, a depth and a width. The slot length is greater than the slot depth, and the slot depth is greater than the slot width. The distribution tool is arranged relative to the web feeding device such that for each of the slots, the slot depth is substantially perpendicular to the machine direction, the slot length is substantially parallel to the machine direction, and the slot width is substantially orthogonal to the slot depth and length.

BRIEF DESCRIPTION OF THE DRAWINGS

FIG. 11B is an enlarged end view of a portion of the distribution tool of

FIG. 2A in applying the abrasive particle of FIG. 10A to a backing;

DETAILED DESCRIPTION

Figure 1:
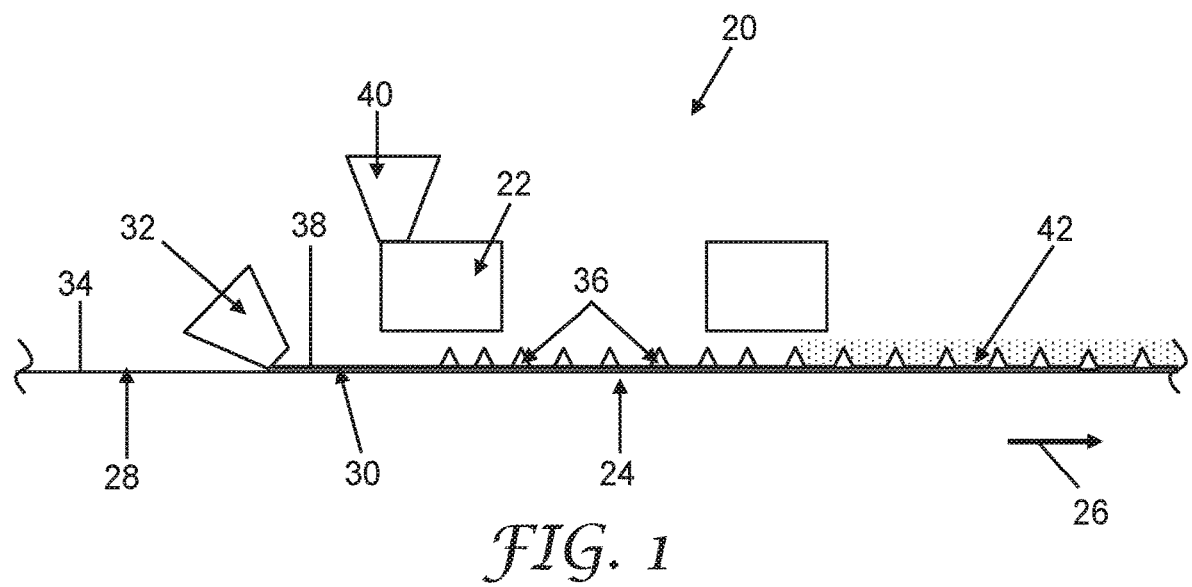
FIG. 1 is a simplified illustration of a portion of a system for manufacturing abrasive articles in accordance with principles of the present disclosure.

Aspects of the present disclosure relate to tools, systems and methods for manufacturing abrasive articles, and in particular devices and methods for applying abrasive particles to a backing construction. As a point of reference, FIG. 1 illustrates portions of a system 20 for manufacturing abrasive articles in accordance with principles of the present disclosure, including a distribution device 22 along with other components or devices commonly employed in the manufacture of abrasive articles. For example, the manufacture of abrasive articles conventionally includes structures and mechanisms (e.g., rollers, conveyor belts, etc.) for moving a backing construction web 24 along a path of travel or machine direction 26. The backing construction web 24 can assume various forms, and in some embodiments includes a backing 28 to which a make coat precursor resin 30 (or other resin or adhesive) has been applied. For example, with the non-limiting arrangement of FIG. 1, the backing 28 is advanced past a coater 32 that applies the make coat precursor resin 30 on a major surface 34 of the backing 28 thereby creating the backing construction web 24 (e.g., a coated backing). In other embodiments, multiple coatings can be applied to the backing 28 to generate the backing construction web 24 as delivered to the distribution tool 22; in yet other embodiments, the backing construction web 24 consists of the backing 28 alone (i.e., prior to interacting with the distribution device 22, the backing 28 is not subjected to a resin coating operation). Abrasive particles 36 (a size of which is greatly exaggerated in FIG. 1 for ease of understanding) are applied to a major face 38 of the backing construction web 24 by the distribution device 22 that otherwise distributes the abrasive particles 36 from a supply 40 as described below. After application of the abrasive particles 36, the backing construction web 24 exits the distribution device 22 and is optionally subjected to further processing (e.g., application of a size coat 42, application of additional abrasive particles by conventional means (e.g., e-coat), application of a grinding aid, application of a supersize coat, curing, cutting, etc.) to produce a final abrasive article, such as a coated abrasive article.

Figure 2A:
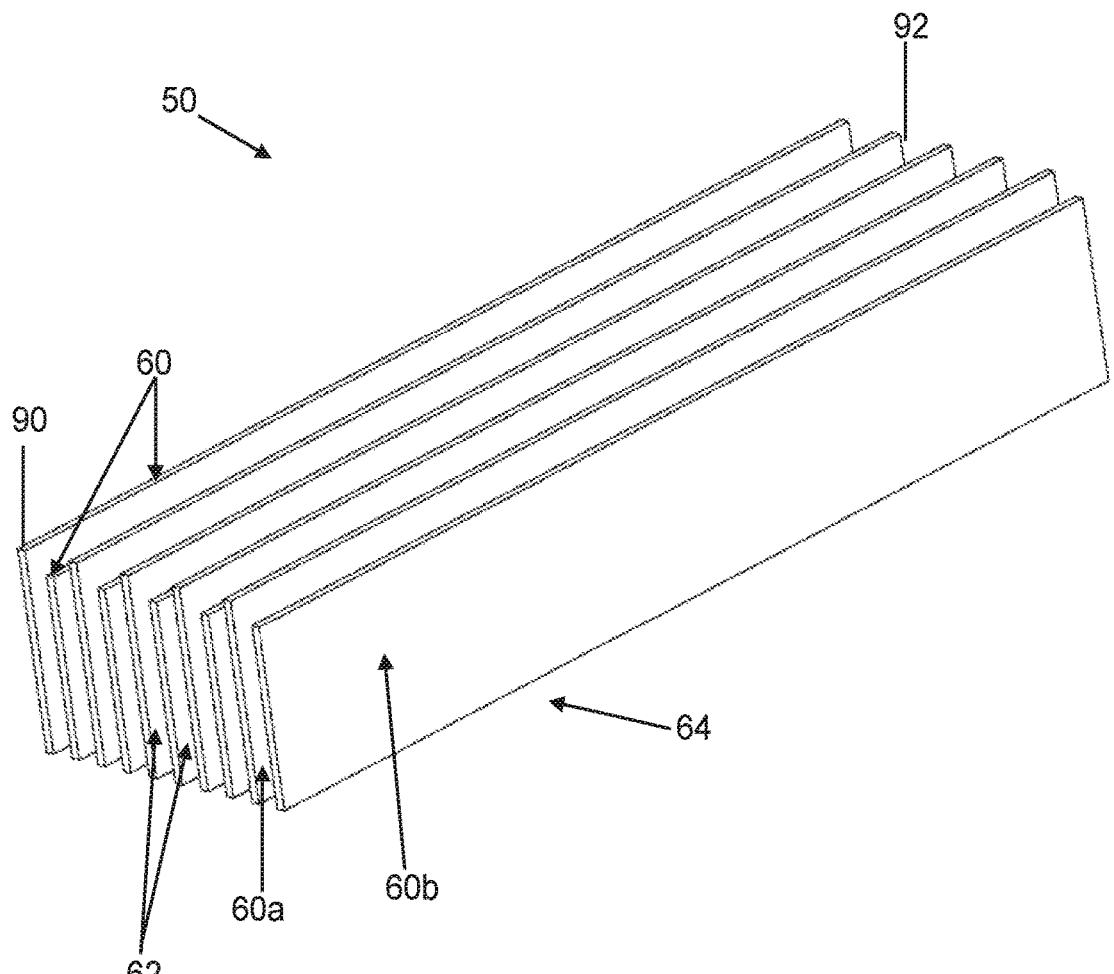
FIG. 2A is a perspective view of a portion of a distribution tool in accordance with principles of the present disclosure and useful with the system of FIG. 1.

The distribution device 22 is configured to effectuate gross biased orientation and alignment of at least a majority of the abrasive particles 36 as applied and subsequently bonded to the major face 38. With this in mind, portions of one embodiment of a distribution tool 50 in accordance with principles of the present disclosure and useful with or as the distribution device 22 (FIG. 1) are shown in simplified form in FIG. 2A-2C. In general terms, the distribution tool 50 includes a plurality of walls 60. The walls 60 are spaced from one another such that a slot 62 is defined between immediately adjacent ones of the walls 60. For ease of explanation, a size of the slots 62 relative to a size of the walls 60 is exaggerated in the views. The distribution tool 50 is configured to distribute abrasive particles (not shown) from a lower side 64 (referenced generally in FIGS. 2A and 2B) thereof in a manner that grossly orients and aligns the abrasive particles. For example, and as described in greater detail below, the walls 60 are arranged such that the slots 62 have a substantially similar width $W_S$ (e.g., the width $W_S$ of the slots 62 varies from one another by no more than 10%) that is selected in accordance with expected nominal dimensions of the abrasive particles so as to grossly bias the abrasive particles to a spatial orientation at the lower side 64.

The walls 60 are elongated, substantially planar (e.g., within 10% of a truly planar construction) bodies formed of a relatively rigid material (e.g., metal, plastic, ceramic, etc.). The walls 60 can be maintained relative to one another in various fashions. For example, the distribution tool 50 can include mounting bodies 70a, 70b assembled to opposite ends, respectively, of each of the walls 60. As a point of reference, the mounting bodies 70a, 70b are illustrated in FIG. 2C and are omitted from the view of FIG. 2A; one of the mounting bodies 70b is shown with phantom lines in FIG. 2B. Regardless of an exact construction, the mounting bodies 70a, 70b maintain the walls 60 in a substantially parallel manner (e.g., the walls 60 are arranged to be within 10% of a truly parallel relationship with one another). Due to their substantially rigid nature, the walls 60 self-maintain the substantially parallel arrangement dictated by the mounting bodies 70a, 70b upon final assembly and during use.

The mounting bodies 70a, 70b may cover or encompass a portion of each of the walls 60, with a linear distance between the mounting bodies 70a, 70b serving to define an effective length $L_W$ of each of the walls 60, as well as a length $L_S$ of each of the slots 62. The length $L_S$ of each of the slots 62 is selected in accordance with expected nominal dimensions of the abrasive particles (not shown) with which the distribution tool 50 will be used as described in greater detail below, including the slot length $L_S$ being sufficient to simultaneously receive a multiplicity of the abrasive particles.

Figure 2B:
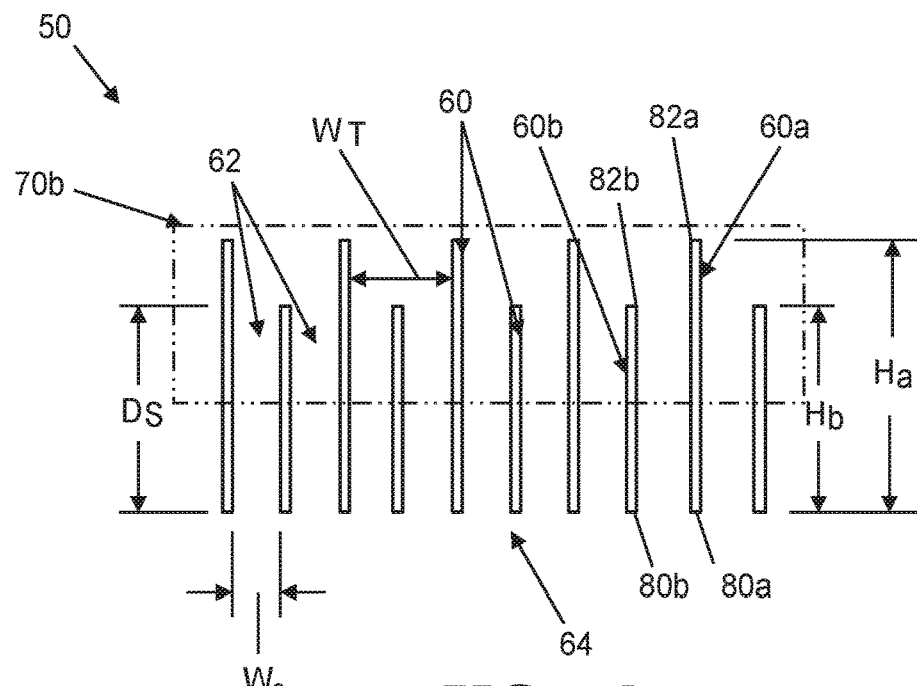
FIG. 2B is an end view of the tool of FIG. 2A.
Figure 2C:
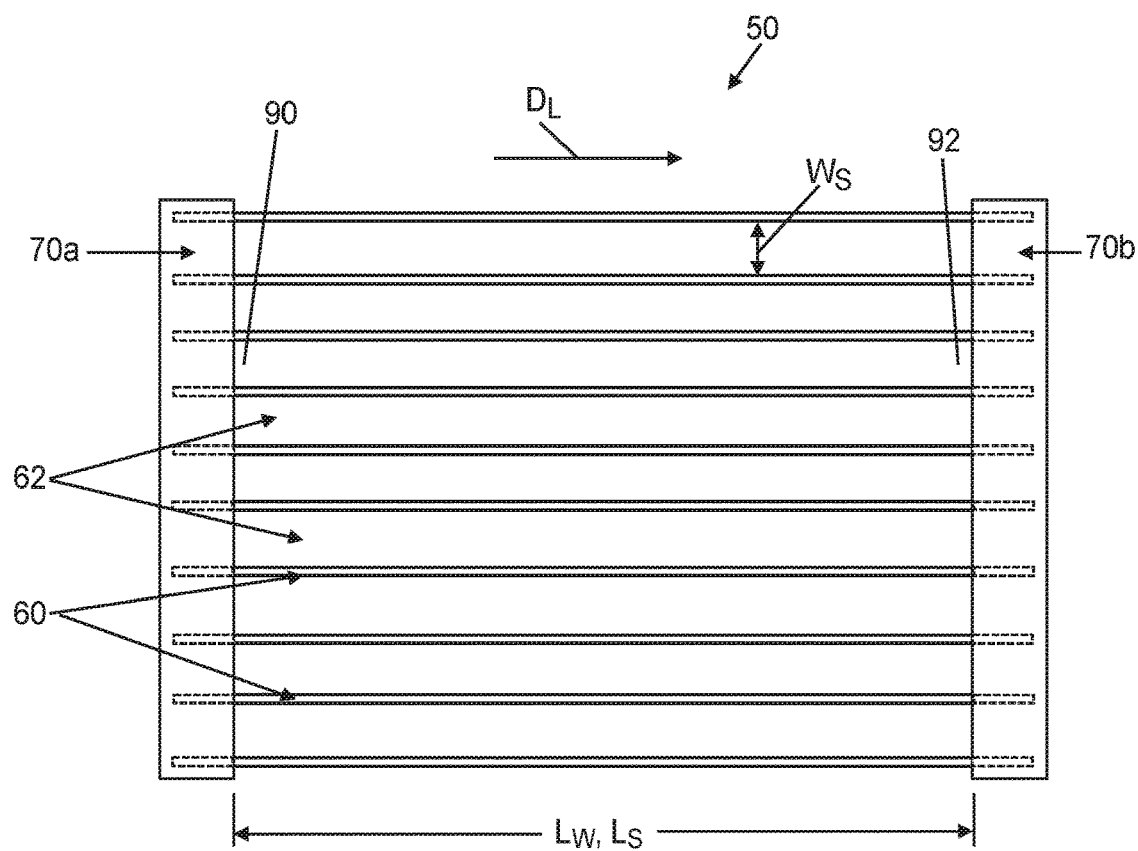
FIG. 2C is a top view of the tool of FIG. 2A.

Each of the walls 60 has a height $H_W$ (labeled as $H_{Wa}$ and $H_{Wb}$ in FIG. 2B for reasons made clear below) defined as the linear distance between opposing, first and second edges 80, 82 (labeled as 80a, 80b, 82a, 82b in FIG. 2B). The elongated shape of each of the walls 60 includes the effective wall length $L_W$ being greater than the corresponding wall height $H_W$ (with the wall height $H_W$ being defined as a linear distance between the opposing edges 80, 82 of the corresponding wall 60). A depth $D_S$ of each slot 62 is defined by the height(s) $H_W$ of the immediately adjacent walls 60 defining the slot 62, and is selected in accordance with expected nominal dimensions of the abrasive particles (not shown) with which the distribution tool 50 will be used, as well as other end-use parameters, as described below. In some embodiments, the wall heights $H_W$ are not identical. For example, and as best reflected by FIG. 2B, the plurality of walls 60 can include alternately located first walls 60a and second walls 60b. The height $H_{Wa}$ of the first walls 60a is greater than the height $H_{Wb}$ of the second walls 60b. The walls 60a, 60b are arranged such that the corresponding first edges 80a, 80b are all substantially aligned with one another at the lower side 64. Due to the differing heights, then, the second edge 82b of the second walls 60b is off-set from the second edge 82a of the first walls 60a in a direction of the lower side 64. The alternating heights $H_{Wa}$, $H_{Wb}$, and in particular the alternating off-set spatial arrangement of the first edges 80a, 80b relative to one another, assists in encouraging abrasive particles to enter the slots 62 as described below. Alternatively, three or more differing wall heights $H_W$ can be incorporated into the distribution tool 50; in yet other embodiments, the walls 60 can all have an identical height.

The distribution tool 50 is configured such that upon final assembly and use as part of the abrasive article manufacturing system 20 (FIG. 1), abrasive particles (not shown) will become loaded into the slots 62, and subsequently be caused to move relative to the slots 62 in a direction of the slot length $L_S$. Thus, the distribution tool 50 can be viewed has providing a length direction $D_L$, commensurate with the slot lengths $L_S$, from an entrance side 90 to an exit side 92. FIG. 2B is an end view of the exit side 92 and reflects that the mounting body 70b (otherwise assembled at the exit side 92) terminates above (relative to the orientation of FIG. 2B) the first edge 80a, 80b of the walls 60. In other words, the mounting body 70b does not extend to the lower side 64 of the distribution tool 50, and a portion of the each of the slots 62 is open at the exit side 92 relative to the mounting body 70b for reasons made clear below. The mounting body 70a at the entrance side 90 may or may not have a similar relationship relative to the first edges 80a, 80b, and can alternatively extend to the lower side 64.

While the distribution tool 50 is illustrated as including ten of the walls 60, any other number, either greater or lesser, is equally acceptable. In more general terms, the number of walls 60 provided with the distribution tool 50 is selected as a function of the desired slot width $W_S$ and a dimension (e.g., cross-web width) of the backing construction web 24 (FIG. 1) as described in greater detail below. In yet other embodiments, the distribution device 22 (FIG. 1) can include two or more of the distribution tools 50 assembled in series to a frame or similar structure.

Figure 3A:
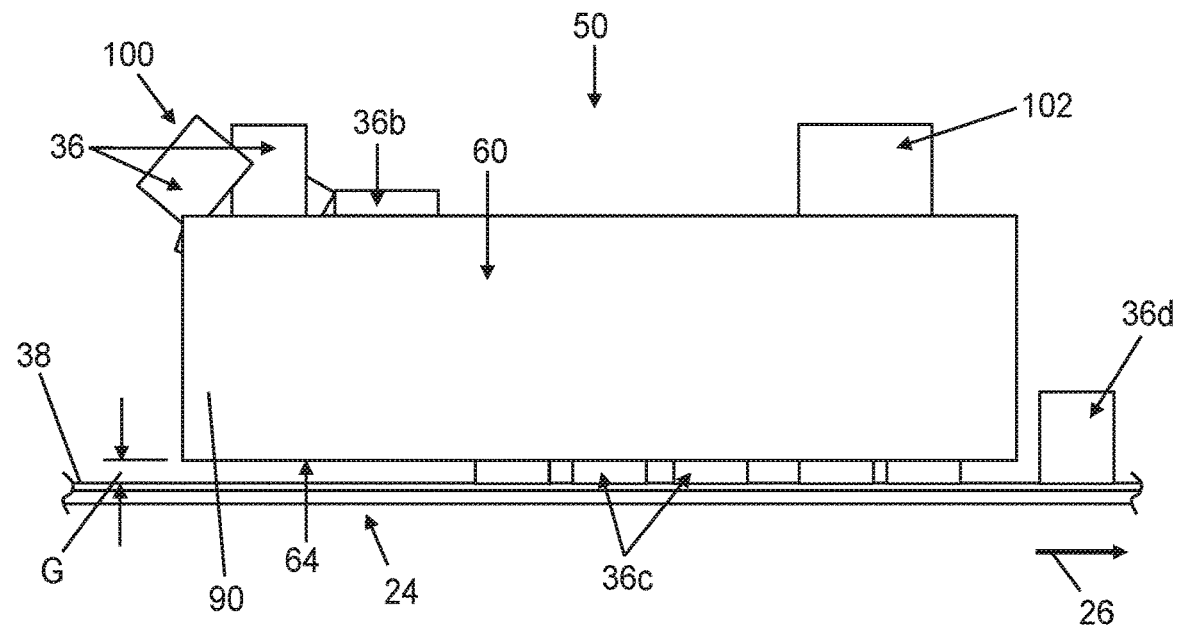
FIG. 3A is a side view of the distribution tool of FIG. 2A as part of a system for manufacturing abrasive articles and distributing abrasive particles on to a web.
Figure 3B:
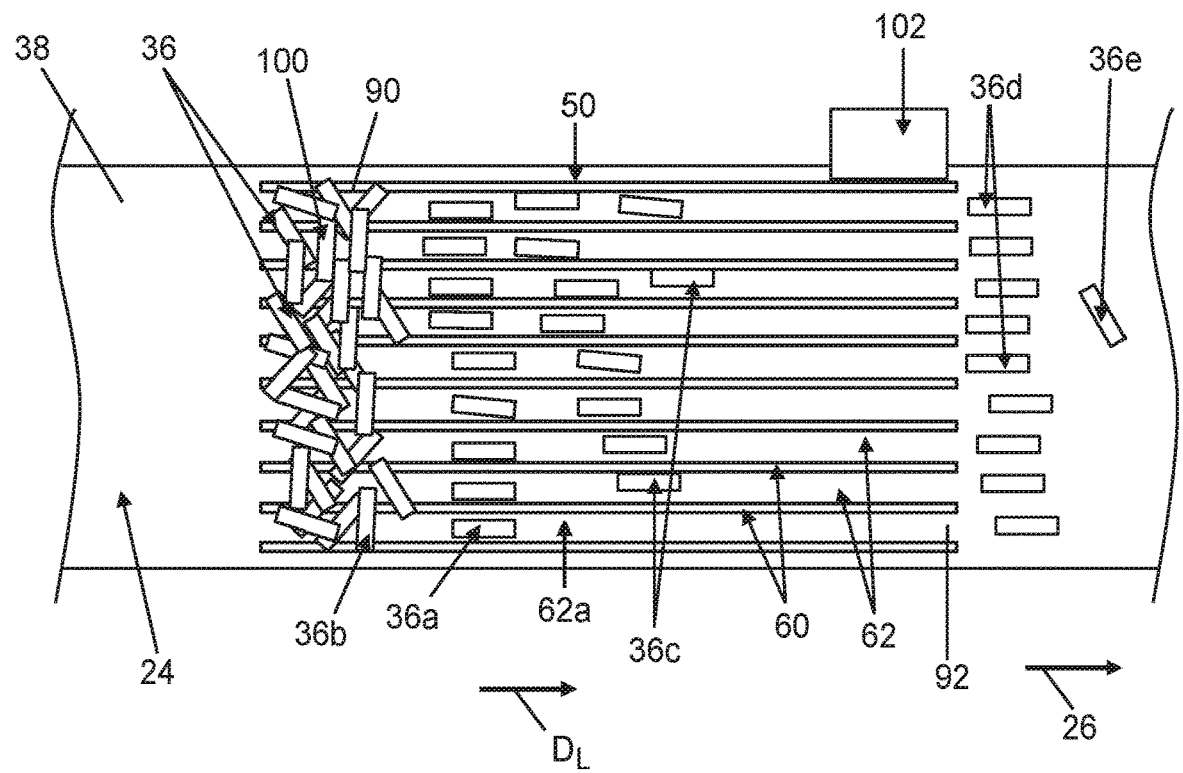
FIG. 3B is a top view of the arrangement of FIG. 3A.
Figure 3C:
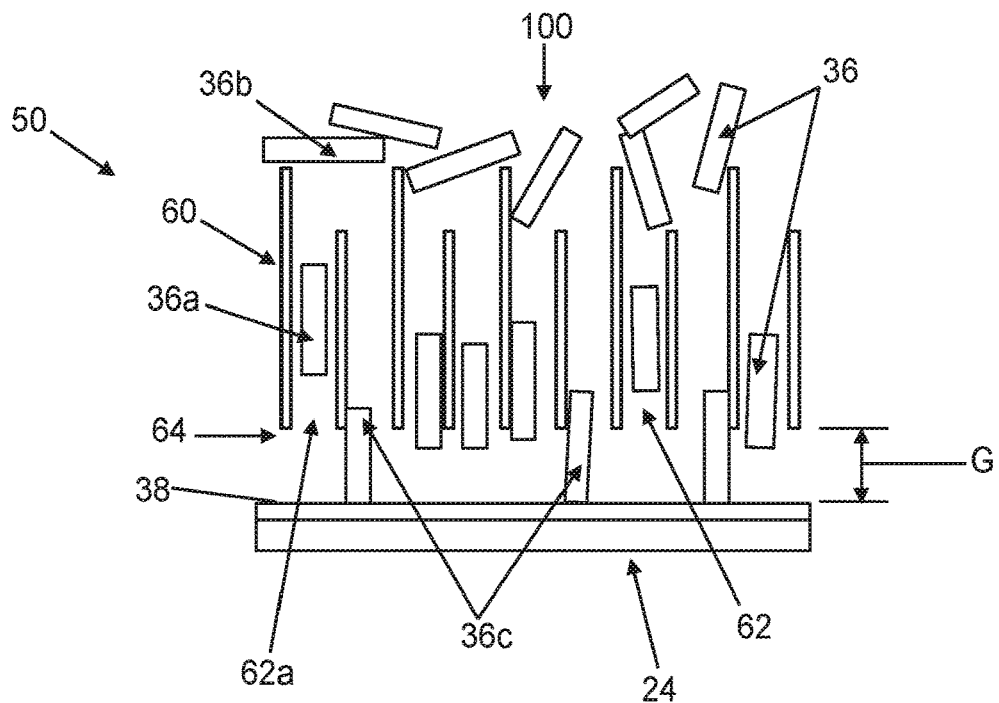
FIG. 3C is an end view of the arrangement of FIG. 3A.

Incorporation of the distribution tool 50 as part of the abrasive article manufacturing system 20 is generally reflected by FIGS. 3A-3C. The distribution tool 50 is located immediately adjacent (e.g., slight above by a distance described in greater detail below) the backing construction web 24. The elongated walls 60 (and thus the slots 62) are substantially aligned (e.g., within 10% of a truly aligned relationship) with the machine direction 26 (e.g., the length direction $D_L$ is substantially aligned or parallel with (e.g., within 10% of a truly aligned or parallel relationship) the machine direction 26.

During use, a supply 100 (referenced generally) of the abrasive particles 36 is loaded onto the distribution tool 50 at or adjacent the entrance side 90. Individual ones of the abrasive particles 36 will enter a respective one of the slots 62 only upon achieving a gross spatial orientation dictated by dimensions of the slots 62. For example, a first abrasive particle 36a in FIGS. 3A-3C is spatially oriented so as to enter the slot 62a, whereas a spatial orientation of a second abrasive particle 36b prevents entry into any of the slots 62. As a point of reference, loading of the supply 100 can include pouring or funneling (e.g., via vibratory feeder, belt driven drop coater, etc.) a large number of the abrasive particles 36 on to the distribution tool 50 under the force of gravity, with individual ones of the so-loaded abrasive particles 36 randomly assuming any spatial orientation. As the individual abrasive particles 36 repeatedly contact one or more of the walls 60, they deflect and assume a new spatial orientation, eventually becoming generally aligned with and assuming a spatial orientation appropriate for entering one of the slots 62. To assist in promoting the gross alignment and orientation, the distribution device 22 (FIG. 1) can include a vibration device 102 connected to the distribution tool 50, causing the abrasive particles 36 to vibrate around on surfaces of the distribution tool 50 until they obtain a suitable orientation and fall through one of the slots 62. Where provided, the direction of vibration can be in a plane of the walls 60; random vibration may reduce the mass flow rate of the abrasive particles 36 through the distribution tool 50 and may knock many of the applied abrasive particles 36 over as they exit the distribution tool 50. Moreover, and as best shown in FIG. 3C, with optional embodiments in which the first edges 80a, 80b are alternately off-set (in the height direction) from one another, abrasive particles 36 are naturally encouraged to assume the spatial orientation appropriate for entering one of the slots 62 thereby reducing "bridging" of the abrasive particles 36 at the top of the distribution tool 50 and increasing the mass flow rate of the abrasive particles 36 through the distribution tool 50. Regardless, and with reference to FIGS. 3A-3C, a large number of abrasive particles 36 can be disposed within individual one of the slots 62 at any one point in time.

Once a necessary spatial orientation is achieved, the so-arranged abrasive particle 36 passes through the corresponding slot 62, falls on to the backing construction web 24 and is at least partially bonded thereto (e.g., the third abrasive particle 36c identified in FIGS. 3A and 3B). The lower side 64 of the distribution tool 50 is spaced from the backing construction web 24 by a gap G that is less than a maximum dimension(s) of the abrasive particles 36. Thus, a portion of the applied abrasive particles 36c remains within the corresponding slot 62. The backing construction web 24 is driven relative to the distribution tool 50 in the machine direction 26, such that the applied abrasive particles 36c travel relative to the distribution tool 50 with movement of the backing construction web 24, freely sliding within the corresponding slot 62. During this movement, one or more of the walls 60 of the distribution tool 50 support the applied abrasive particles 36c, preventing the applied abrasive particles 36c from experiencing an overt change in spatial orientation (e.g., the applied abrasive particles 36c are preventing from overtly tipping or rotating in a direction perpendicular to the corresponding slot 62). Upon traveling beyond the exit side 92, the abrasive particles 36 are now more firmly bonded to the backing construction web 24 (e.g., abrasive particles 36d identified in FIGS. 3A and 3B), and maintain the gross biased orientation and alignment dictated by the distribution tool 50. In other words, systems and methods of the present disclosure include the applied abrasive particles 36c being in simultaneously contact with the backing construction web 24 and one (or more) of the walls 60 of the distribution tool 50 over a dwell period in which the applied abrasive particle 36c is caused to travel the length of the distribution tool 50 and progress beyond the exit side 92.

In some embodiments, some of the abrasive particles 36 included with the supply 100 dispensed or loaded on to the distribution tool 50 will not experience the gross bias orientation and alignment sequence or steps described above. For example, as the supply 100 flows on to the distribution tool 50 at the entrance side 90, individual ones of the abrasive particles can defect or "bounce" off the walls 60 in a direction of the exit side 92; invariably, individual ones of the abrasive particles 36 will deflect or bounce off of the walls 60, beyond the exit side 92 and onto the backing construction web 24. FIG. 3B illustrates one example of a random abrasive particle 36e that has secured on to the backing construction web 24 without passing through one of the slots 62. Abrasive article manufacturers and end-users may prefer this random occurrence of non-biased abrasive particles 36e. Thus, systems and methods of the present disclosure include at least a majority, optionally at least 75%, 85%, 90% or 95%, of the abrasive particles 36 included with the supply 100 as loaded to the distribution tool 50 undergoing a particle orientation sequence in which the abrasive particle 36: 1) enters one of the slots 62; 2) passes partially through the corresponding slot 62 such that a first portion of the abrasive particle is beyond the lower side 64 and in contact with the major face 38 of the backing construction web 24 and a second portion is within the slot 62; and 3) remains in simultaneous contact with at least one of the walls 60 and the major face 38 for a dwell period in which the backing construction web 24 moves relative to the distribution tool 50. Less than 100% of the abrasive particles 36 included with the supply 100 as loaded onto the distribution tool 50 undergo the particle orientation sequence in some embodiments.

Figure 4:
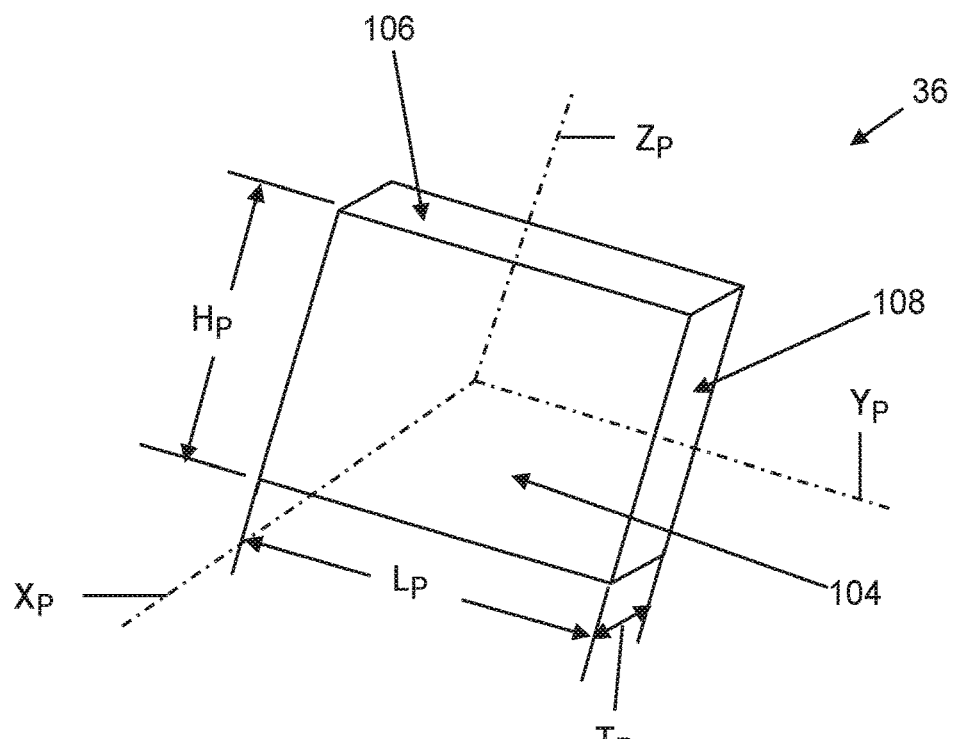
FIG. 4 is a perspective view of an abrasive particle useful with the tools, systems, and methods of the present disclosure.

The gross biased orientation and alignment provided by distribution tools of the present disclosure can be characterized by reference to major axes and dimensions of the abrasive particle. FIG. 4 is a generic, non-limiting example of the abrasive particle 36, the exterior shape of which defines a particle maximum length, maximum height and maximum thickness $L_P$, $H_P$, $T_P$ dimensions that represent maximum dimensions of the abrasive particles 36 in three orthogonal planes. The particle maximum length, height and thickness $L_P$, $H_P$, $T_P$ are a function of a shape of the abrasive particle 36, and the shape may or may not be uniform. The present disclosure is in no way limited to any particular abrasive particle shape, dimensions, type, etc., and several exemplary abrasive particles useful with the present disclosure are described in greater detail below. However, with some shapes the "height" of the abrasive particle 36 may more conventionally be referred to as a "width". The abrasive particle 36 is shown in FIG. 4 as arbitrarily having a rectangular prism shape, with opposing major faces 104 (one of which is visible), opposing major side faces 106 (one of which is visible), and opposing minor side faces 108 (one of which is visible). Regardless of an exact shape, any abrasive particle can be described as providing the particle maximum length $L_P$ as the largest dimension in any one plane, the particle maximum height $H_P$ as being the largest dimension in any plane orthogonal to the plane of the maximum length $L_P$, and the maximum thickness $T_P$ as being the largest dimension in a third plane orthogonal to the planes of the maximum length $L_P$ and height $H_P$. The particle maximum length $L_P$ is greater than or equal to the particle maximum height $H_P$, and the particle maximum height $H_P$ is greater than or equal to the particle maximum thickness $T_P$. Abrasive particles useful with the present disclosure can have circular or spherical geometries such that the terms "length", "height" or "thickness" are inclusive of diameter.

A shape of the abrasive particle 36 defines a centroid at which particle $X_P$, $Y_P$ and $Z_P$ axes can be defined (the particle $X_P$, $Y_P$ and $Z_P$ axes are orthogonal relative to one another). With the conventions of FIG. 4, the particle $Z_P$ axis is parallel with the maximum height $H_P$, the $Y_P$ axis is parallel with the maximum length $L_P$, and the $X_P$ axis is parallel with the maximum thickness $T_P$. As a point of reference, the particle $X_P$, $Y_P$, $Z_P$ axes are identified for the abrasive particle 36 as a standalone object independent of the backing construction web 24 (FIG. 3A); once applied to the backing construction web 24, a "z-axis rotation orientation" of the abrasive particle 36 is defined by the particle's angular rotation about a z-axis passing through the particle and through the backing to which the particle is attached at a 90 degree angle to the backing.

Figure 5A:
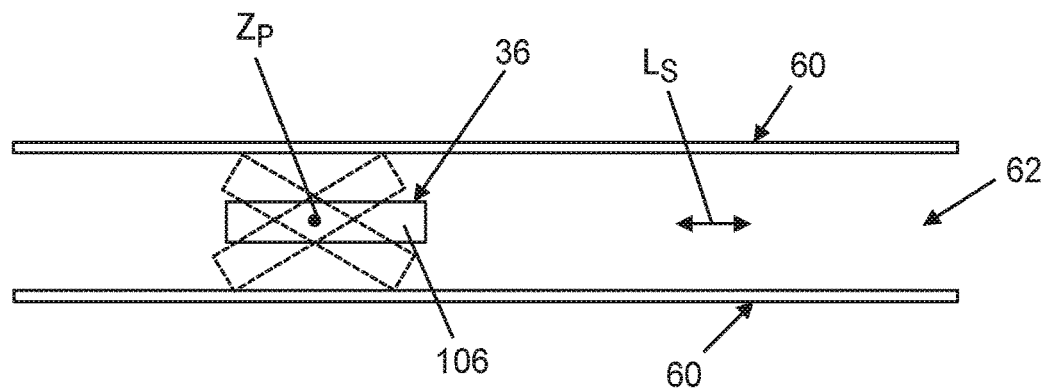
FIG. 5A is a top view of a portion of the distribution tool of FIG. 2A interacting with the abrasive particle of FIG. 4.
Figure 5B:
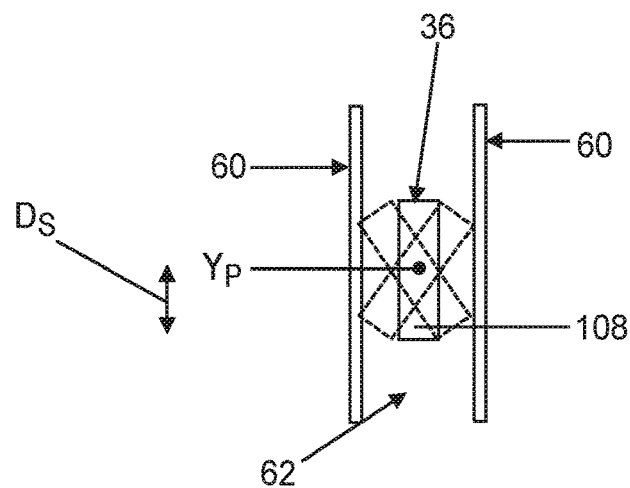
FIG. 5B is an end view of the arrangement of FIG. 5A.
Figure 5C:
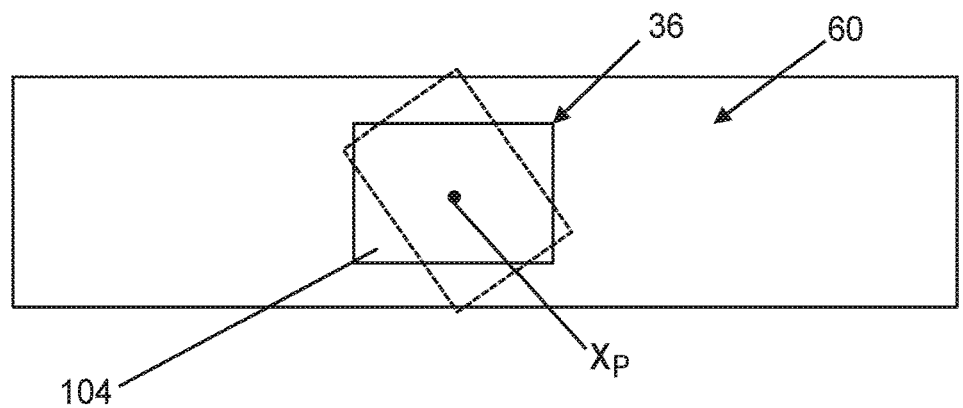
FIG. 5C is a side view of the arrangement of FIG. 5A.

The gross biased orientation effected by the distribution tools of the present disclosure entail dictating or limiting a spatial arraignment of the abrasive particle to a range of rotational orientations about the particle $Z_P$ axis and to a range of rotational orientations about the particle $Y_P$ axis; the gross biased orientation does not dictate or limit a rotational orientation about the particle $X_P$ axis. For example, FIG. 5A provides a top view of the abrasive particle 36 within one of the slots 62. The opposing walls 60 limit a rotational orientation of the abrasive particle 36 about the $Z_P$ axis to a range reflected by phantom representations of the abrasive particle 36. Similarly, FIG. 5B is an end view of the abrasive particle 36 within the slot 62. Gross biased orientation includes the opposing walls 60 limiting a rotational orientation of the abrasive particle 36 about the $Y_P$ axis within a range reflected by phantom representations of the abrasive particle 36. Finally, FIG. 5C is a side view of the abrasive particle 36 within the slot 62 (referenced generally) relative to one of the wall 60 (it being understood that the opposing wall of the slot 62 is not shown). The abrasive particle 36 can freely assume any rotational orientation about the $X_P$ axis (one possible rotational orientation about the $X_P$ axis is represented in phantom in FIG. 5C).

Figure 6A:
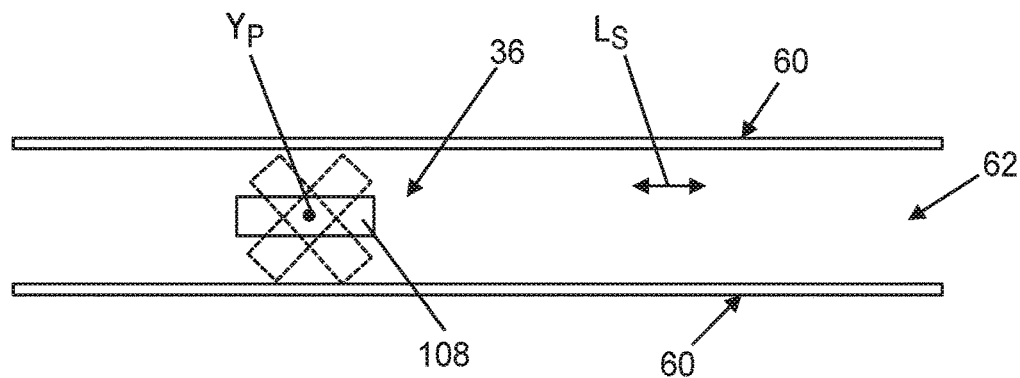
FIGS. 6A-6C illustrate the arrangement of FIGS. 5A-5C with the abrasive particle in a different orientation.
Figure 6B:
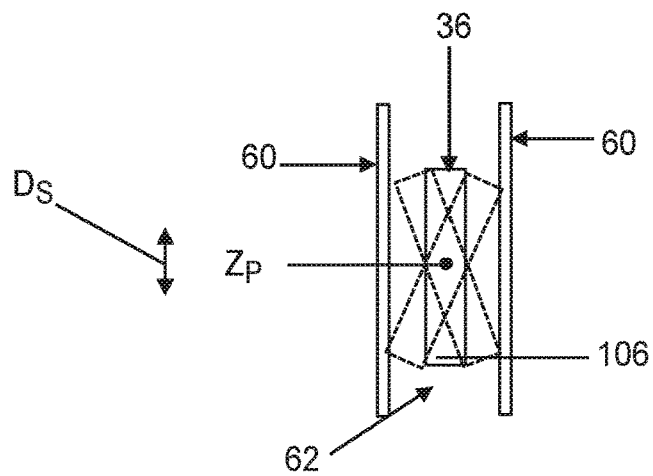
Figure 6C:
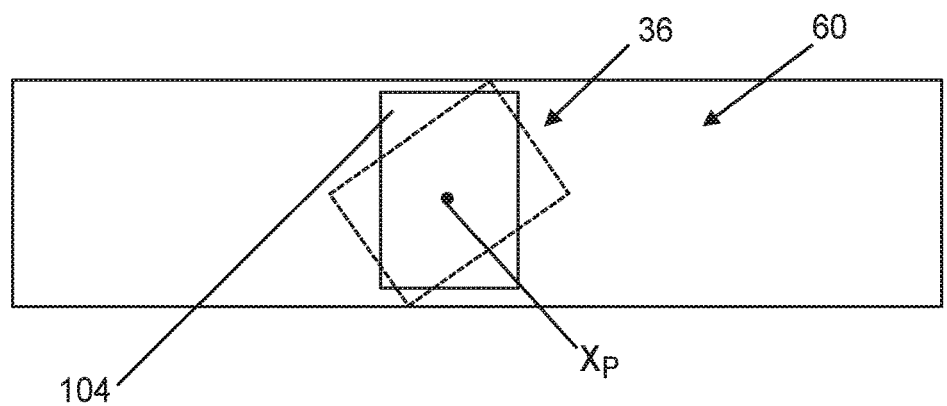

Depending upon the dimensions of the slot 62 and of the abrasive particle 36, the abrasive particle 36 may be able to "fit" within the slot 62 such that the particle $Y_P$ and $Z_P$ axes are rotated 90 degrees from the representations of FIGS. 5A and 5B in which the abrasive particle 36 is randomly arranged with the major side faces 106 parallel with the slot length $L_S$ and the minor side faces 108 parallel with the slot depth $D_S$. FIGS. 6A-6C is another possible arrangement in which the minor side faces 108 are parallel with the slot length $L_S$, and the major side faces 106 are parallel with the slot depth $D_S$. Once again, a gross biased orientation is achieved in which the abrasive particle is limited to a range of orientations about the particle's $Y_P$ and $Z_P$ axes; the abrasive particle 36 can assume any rotational orientation about the particle $X_P$ axis.

With the above general explanations in mind and with reference between FIGS. 2A-2C and 4, it will be recalled that dimensions of the walls 60 and the slots 62 are selected as a function of expected geometry or dimensions of the abrasive particles 36 to be processed. In more general terms, the dimensions of the walls 60 and the slots 62 are selected based upon the particle maximum length $L_P$, maximum height $H_P$, and maximum thickness $T_P$ of the abrasive particles to be processed (it being understood that a bulk supply of a particular abrasive particle will purport to contain identically sized and shaped abrasive particles; invariably, however, individual ones of the abrasive particles within the bulk supply will have dimensions that slightly vary from one another within an accepted tolerances; thus, when selecting dimensions for the walls 60 and the slots 62 for distributing the abrasive particles of the bulk supply as described in the present disclosure, the "dimensions" of any one abrasive particle of the bulk supply can be with reference to nominal dimension of the bulk supply).

Dimensions of the walls 60 and the slots 62 are generally configured such that the slot width $W_S$ is less than at least the abrasive particle maximum length $L_P$, and optionally less than the abrasive particle maximum height $H_P$, dictating that the abrasive particle 36 must achieve a gross biased orientation before entering and passing through one of the slots 62, with the walls 60 further serving to support the abrasive particle 36 in the biased orientation as described below. While the slot width $W_S$ can closely approximate the maximum thickness $T_P$ so as to dictate a more precise particle $Z_P$ axis and $Y_P$ axis rotation orientation of the applied abrasive particles 36 (i.e., as the slot width $W_S$ approaches the maximum thickness $T_P$, the range of possible $Z_P$ axis and $Y_P$ axis rotational orientations the abrasive particle 36 can assume and still "fit" in the slot 62 is reduced), in some embodiments, the slot width $W_S$ is greater than the maximum thickness $T_P$ for enhanced throughput time (i.e., by providing a larger slot width $W_S$, abrasive particles 36 can randomly assume a larger range of $Z_P$ axis and $Y_P$ axis rotational orientations and still enter/pass through one of the slots 62, thereby making it "easier" for an individual abrasive particle 36 to obtain an appropriate spatial orientation and improving the mass flow rate of the abrasive particles 36 through the distribution tool 50), approaching, but not exceeding, the particle maximum length and maximum height $L_P$, $H_P$. For example, the slot width $W_S$ can be 50-75% of the maximum height $H_P$ (so long as the calculated value is greater than the maximum thickness $T_P$). In yet other embodiments, the selected slot width $W_S$ is a non-integer factor of the maximum thickness $T_P$ (i.e., the slot width $W_S$ is not equal to the maximum thickness $T_P$, $2T_P$, $3T_P$, etc.) to avoid clogging (e.g., were the slot width $W_S$ to be equal to two times the maximum thickness $T_P$, two abrasive particles 36 could become aligned side-by-side each other and then collectively become lodged to the opposing walls 60 of one of the slots 62). With optional embodiments incorporating the alternating height walls 60a, 60b, a width $W_T$ (identified in FIG. 2B) between an adjacent pair of the taller walls 60a can be selected to be greater than the particle maximum length $L_P$ and maximum height $H_P$. With this design criteria, a single abrasive particle 36 cannot span two "high" points (e.g., the second ends 82a of an adjacent pair of the taller walls 60a), greatly increasing the mass flow of the abrasive particles 36 through the distribution tool 50.

The slot depth $D_S$ is selected to approximate or be greater than at least the particle maximum height $H_P$ (or particle maximum length $L_P$ where the shape of the particular abrasive particle does not implicate a height differing from a length) so as to better ensure that individual ones of the abrasive particles 36 attain the desired gross biased orientation and are supported in this orientation as they traverse the corresponding slot 62. Thus, the wall height $H_W$ is at least equal to the maximum particle height $H_P$ in some embodiments. Where the walls 60 have differing heights (e.g., with the non-limiting embodiment of FIGS. 2A-2C, the height $H_b$ of the second walls 60b is less than the height $H_a$ of the first walls 60a), the height of the shortest wall 60 is at least equal to the maximum height $H_P$ in some embodiments. In other constructions, the slot depth $D_S$ can be less than the maximum particle height $H_P$.

Figure 7:
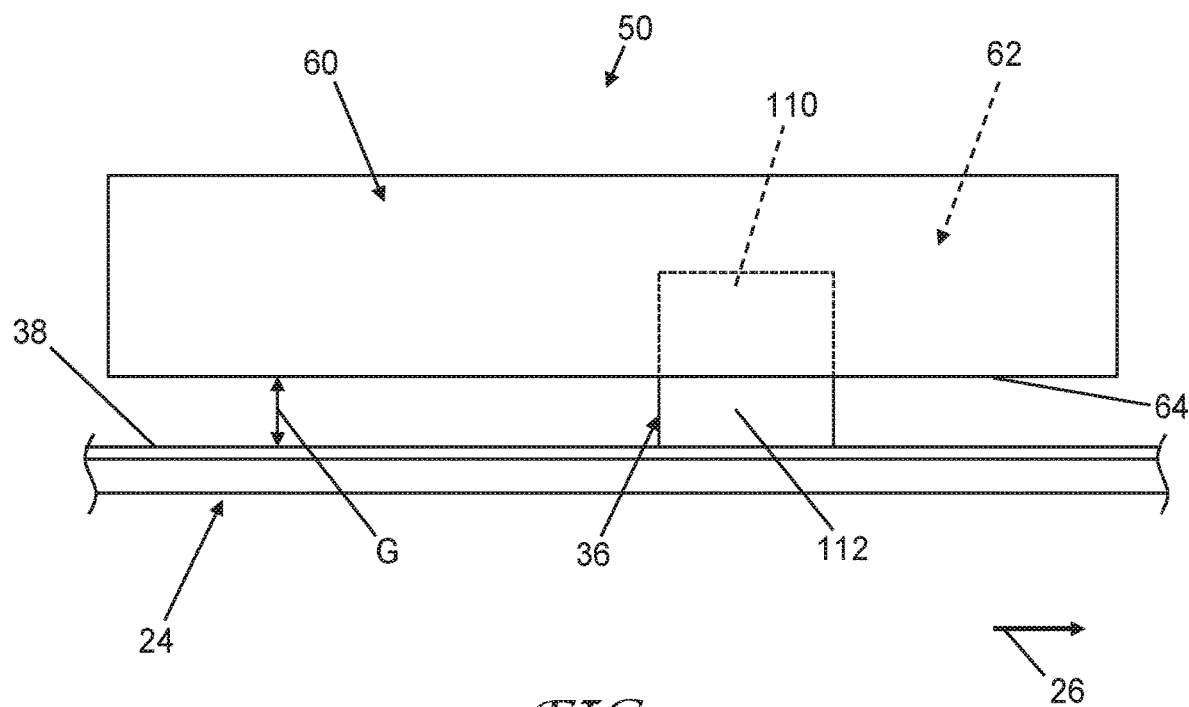
FIG. 7 is an enlarged side view of the distribution tool of FIG. 2A interacting with the abrasive particle of FIG. 4 as part of a system for manufacturing abrasive articles.

Dimensions of the abrasive particles 36 can also be utilized to determine a size of the gap G between the lower side 64 of the distribution tool 50 and the backing construction web 24 as shown in FIG. 7. In particular, the gap G is sized so as to ensure that once in contact with the backing construction web 24, a portion of the abrasive particle 36 remains "within" the corresponding slot 62 (referenced generally in FIG. 7, it being understood that in the view of FIG. 7, the slot 62 is "hidden" behind the wall 60 otherwise visible in the illustration), supported by at least one of the corresponding walls 60. In some embodiments, and with cross-reference between FIGS. 4 and 6, the size of the gap G is 25-90% of the particle maximum height $H_P$, alternatively 50-75% of the particle maximum height $H_P$. For example, in the illustration of FIG. 7, the abrasive particle 36 has achieved the gross biased orientation dictated by the distribution tool 50, fallen along one of the slots 62, and become arranged on the backing construction web 24. Because the gap G is less that the particle maximum height $H_P$, a first portion 110 of the abrasive particle 36 remains within the slot 62, and a second portion 112 is beyond the lower side 64. Thus, the abrasive particle 36 is supported by at least one of the walls 60 (i.e., the first portion 110 contacts at least one of the walls 60) as the abrasive particle 36 traverses along the distribution tool 50 with movement of the backing construction web 24 in the machine direction 26. In other embodiments, the lower side 64 can be located in even closer proximity to the backing construction web 24, including being in contact with the major face 38.

Figure 8A:
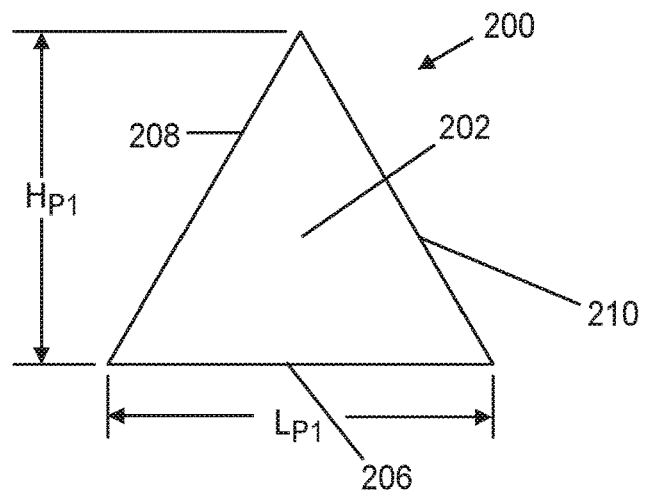
FIG. 8A is a top plan view of another abrasive particle useful with the tools, systems, and methods of the present disclosure.
Figure 8B:
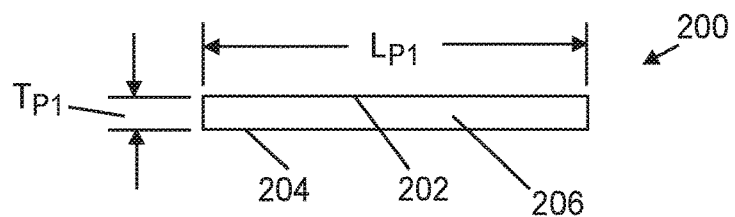
FIG. 8B is an end view of the abrasive particle of FIG. 8A.
Figure 8C:
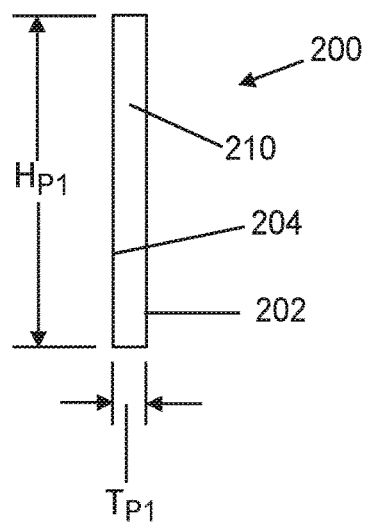
FIG. 8C is a side view of the abrasive particle of FIG. 8A.

The above criteria for construction of the distribution tools of the present disclosure, and in particular dimensions of the walls 60, the slots 62 and the gap G, can be applied to a plethora of different abrasive particle constructions. For example, particle maximum length, height and thickness $L_{P1}$, $H_{P1}$, $T_{P1}$ are designated for one exemplary abrasive particle 200 shape in FIGS. 8A-8C. A shape of the abrasive particle 200 is akin to an equilateral triangular prism, with FIG. 8A providing a top view, FIG. 8B an end view, and FIG. 8C a side view. Due to the equilateral triangular prism shape, the maximum length $L_{P1}$ and the maximum height $H_{P1}$ are uniform across a thickness of the abrasive particle 200 (i.e., the abrasive particle 200 can be viewed as defining opposing major faces 202, 204; the maximum length and height $L_{P1}$, $H_{P1}$ exist at both of the faces 202, 204). The maximum height $H_{P1}$ is known or can be calculated, and is less than the maximum length $L_{P1}$. The maximum thickness $T_{P1}$ is less than the maximum length and height $L_{P1}$, $H_{P1}$. Side faces 206-210 of the abrasive particle 200 have an identical shape and size, and are perpendicular to the major faces 202, 204.

Figure 9A:
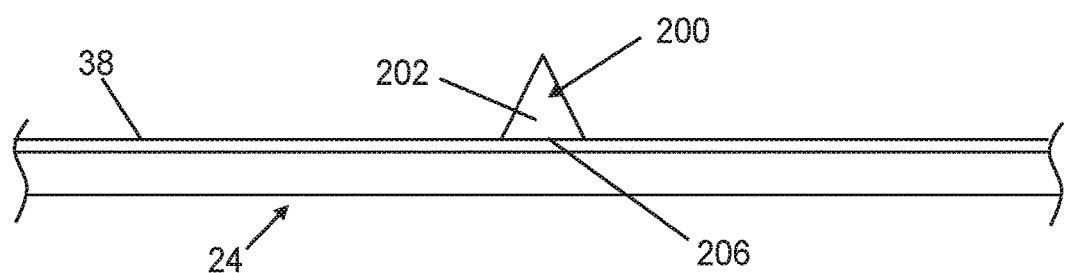
FIG. 9A is a side view of the abrasive particle of FIG. 8A attached to a backing.

An abrasive article manufacturer may prefer that the abrasive particle 200 be applied to and retained at the major face 38 of the backing construction web 24 in an "upright" position as generally reflected by FIG. 9A (i.e., one of the side faces 206-210 of the abrasive particle 200 bears against or is embedded into the backing construction major face 38, as compared to a non-upright orientation in which one of the particle major faces 202, 204 is at the backing construction major face 38). With reference to FIGS. 2A-2C and 8A-8C, the distribution tool 50 can be configured to grossly bias the abrasive particle 200 to the desired upright position by forming the slot width $W_S$ to be less than the particle maximum length and height $L_{P1}$, $H_{P1}$, and greater than the maximum thickness $T_{P1}$, commensurate with the descriptions above.

The slot depth $D_S$ is selected to approximate or be greater than the maximum height $H_{P1}$ so as to better ensure that individual ones of the abrasive particles 200 attain the desired gross biased orientation and are supported in this orientation as they traverse the corresponding slot 62. Thus, the wall height H is at least equal to the particle maximum height $H_{P1}$ in some embodiments. Where the walls 60 have differing heights (e.g., with the non-limiting embodiment of FIGS. 2A-2C, the height $H_b$ of the second walls 60b is less than the height $H_a$ of the first walls 60a), the height of the shortest wall 60 is at least equal to the maximum particle height $H_{P1}$ in some embodiments. In other constructions, the slot depth $D_S$ can be less than the maximum height $H_{P1}$.

Figure 9B:
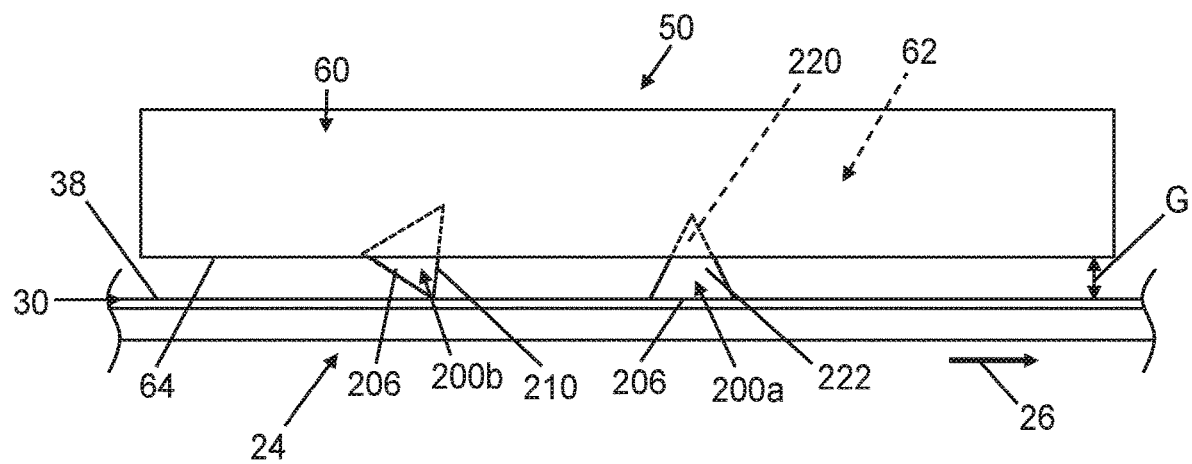
FIG. 9B is a side view of the distribution tool of FIG. 2A interacting with the abrasive particle of FIG. 8A as part of a system for manufacturing abrasive articles.

Dimensions of the abrasive particles 200 can also be utilized to determine a size of the gap G between the lower side 64 of the distribution tool 50 and the backing construction web 24 as shown in FIG. 9B. In particular, the gap G is sized so as to ensure that once in contact with the backing construction web 24, a portion of the abrasive particle 200 remains "within" the corresponding slot 62 (referenced generally in FIG. 9B), supported by at least one of the corresponding walls 60. In some embodiments, and with cross-reference between FIGS. 8A and 9B, the size of the gap G is 50-75% of the particle maximum height $H_{P1}$. For example, a first abrasive particle 200a is identified in FIG. 9B. The first abrasive particle 200a has achieved the gross biased orientation dictated by the distribution tool 50, fallen along one of the slots 62, and become arranged on the backing construction web 24 (i.e., the first side face 206 bears on or in the major face 38). Because the gap G is less that the particle maximum height $H_{P1}$, a first portion 220 of the abrasive particle 200a remains within the slot 62, and a second portion 222 is beyond the lower side 64. Thus, the abrasive particle 200a is supported by at least one of the walls 60 (i.e., the first portion 220 contacts at least one of the walls 60) as the abrasive particle 200a traverses along the distribution tool 50 with movement of the backing construction web 24 in the machine direction 26.

Figure 9C:
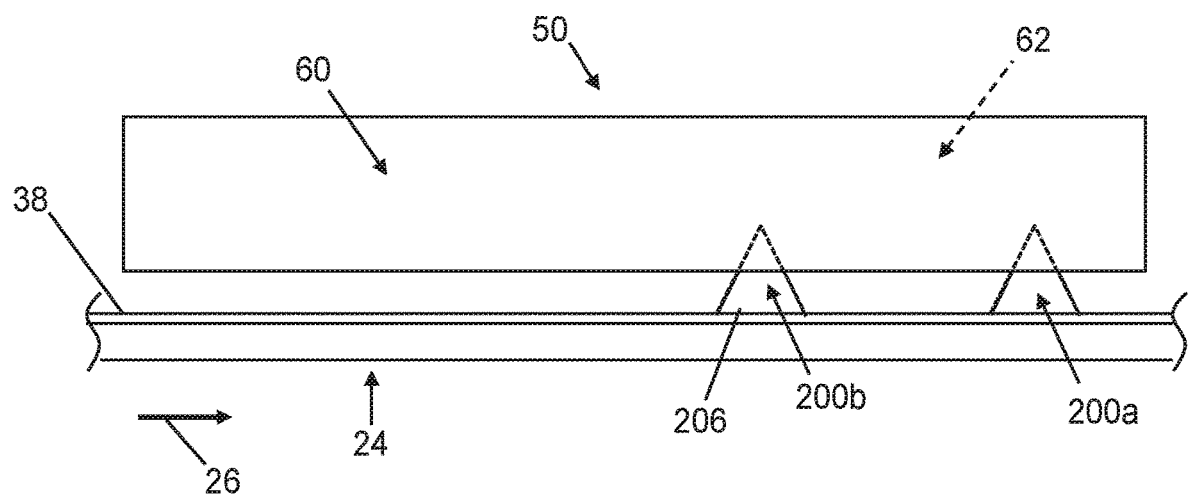
FIG. 9C is the arrangement of FIG. 9B at a later point in time.
Figure 9D:
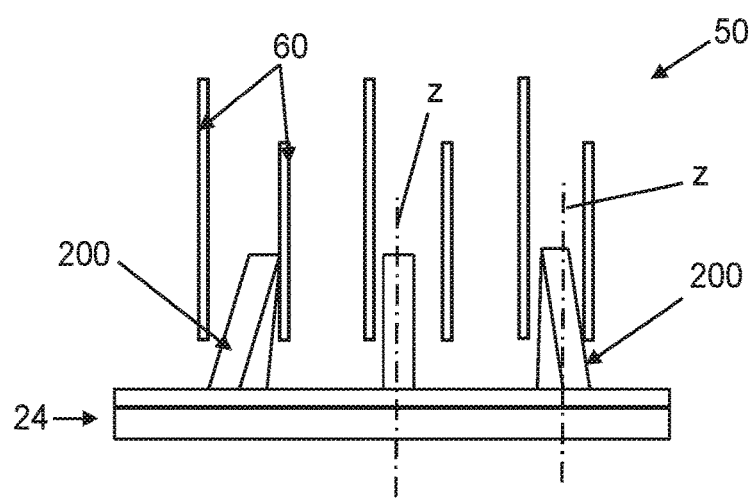
FIG. 9D is an end view of the arrangement of FIG. 9B.

FIG. 9B further reflects that as the abrasive particles 200 initially drop or fall along one of the slots 62, rotational orientation about the particle $X_P$ axis (FIG. 4) is effectively unconstrained, such that the abrasive particle 200 can initially contact the backing construction web 24 at a wide range of particle $X_P$ axis rotational orientations. For example, a second abrasive particle 200b is identified in FIG. 9B as initially contacting the backing construction web 24 at a skewed rotational orientation (i.e., none of the side faces 206-210 are parallel with the major face 38). Once in contact with the backing construction web 24, the abrasive particle 200b will naturally seek a stable orientation as it traverses the distribution tool 50 while being pulled along by the backing construction web 24 in the machine direction 26. This is a "base down" orientation in typically weights of the make coating 30. FIG. 9C represents a later point in time; with movement of the backing construction web 24, the abrasive particle 200b has now naturally attained a stable orientation in which the side face 206 is against or in the major face 38. Commensurate with the above descriptions, in this self-adjusted orientation, a portion of the abrasive particle 200b remains within the slot 62 (referenced generally), supported by at least one of the walls 60. Finally, the end view of FIG. 9D reflects that the gross biased orientation effectuated by the distribution tool 50 limits the z-axis rotational orientation (i.e., the applied particle's 200 angular rotation about a z-axis passing through the particle 200 and through the backing 24 to which the particle 36 is attached at a 90 degree angle to the backing 24) exhibited by each of the attached abrasive particles 200 to a prescribed range, although the z-axis rotational orientations will not be identical for all of the abrasive particles 200.

Figure 10A:
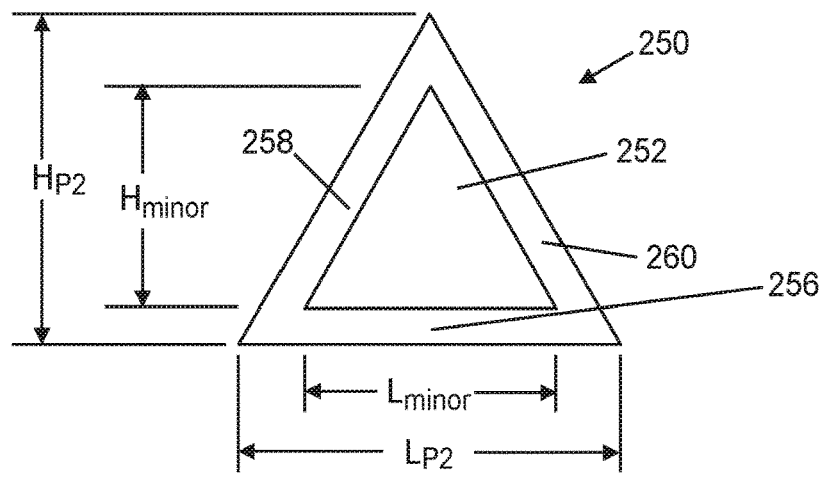
FIG. 10A is a top plan view of another abrasive particle useful with the tools, systems, and methods of the present disclosure.
Figure 10B:
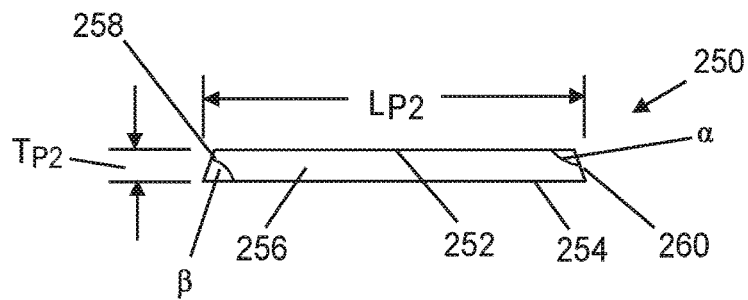
FIG. 10B is an end view of the abrasive particle of FIG. 10A.
Figure 10C:
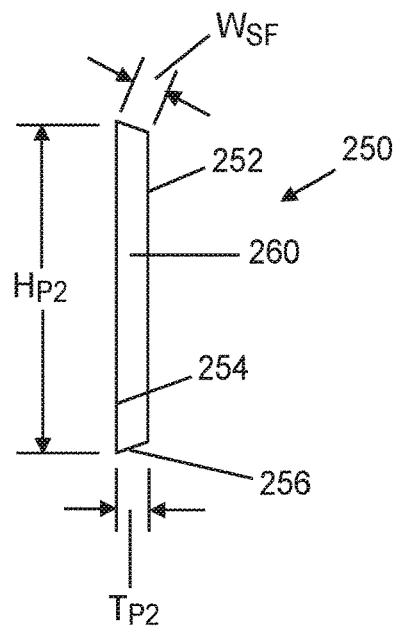
FIG. 10C is a side view of the abrasive particle of FIG. 10A.

A number of other abrasive particle shapes are useful with the distribution tools, systems and methods of the present disclosure. For example, the particle maximum length, height and thickness $L_{P2}$, $H_{P2}$, $T_{P2}$ are designated for another exemplary abrasive particle 250 shape in FIGS. 10A-10C. The shape of the abrasive particle 250 is akin to an equilateral triangular tapered prism in which the particle maximum length $L_{P2}$ is greater than the particle maximum height $H_{P2}$. However, the tapered geometry across the thickness dictates that dimensions of the abrasive particle 250 at a first major face 252 differ from those at a second, opposing major face 254. As generally reflected by the views, the maximum length $L_{P2}$ and the maximum height $H_{P2}$ are found at the second major face 254; while the first major face 252 has length and height dimensions (labeled as $L_{minor}$, $H_{minor}$) the length and height of the abrasive particle 250 at the first major face 252 are less than those of the second major face 254, with the maximum length and height dimensions $L_{P2}$, $H_{P2}$ existing or being measured at the second major face 254. The maximum thickness $T_{P2}$ is less than the maximum length and height $L_{P2}$, $H_{P2}$. Side faces 256-260 of the abrasive particle 250 have an identical shape and size, and can be characterized as "sloping", defining a draft angle α relative to the first major face 252 and a base angle β relative to the second major face 254. For example, the abrasive particle 250 can assume any of the constructions described in US Publication No. 2010/0151196 entitled "Shaped Abrasive Particle With A Sloping Sidewall" the teachings of which are incorporated herein by reference.

Figure 11A:
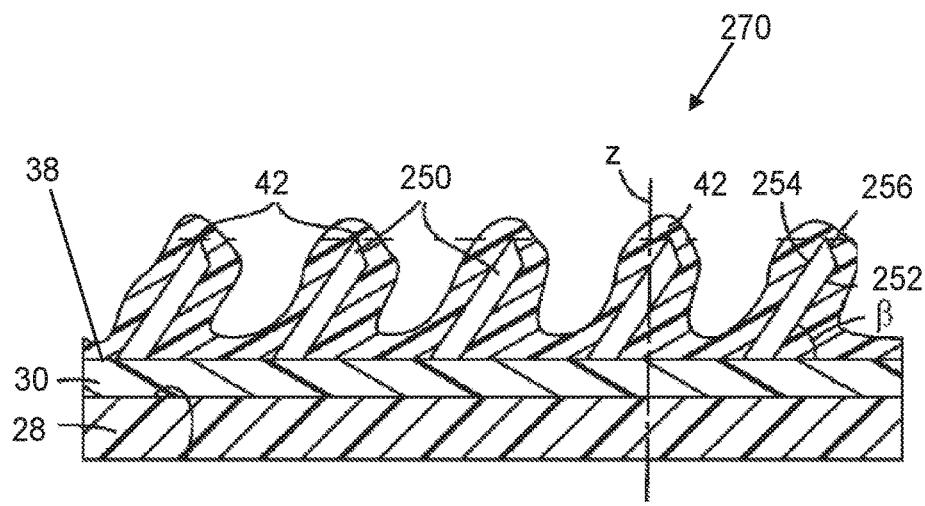
FIG. 11A is a cross-sectional view of an abrasive article including the abrasive particles of FIG. 10A.

An abrasive article manufacturer may prefer that the abrasive particle 250 be applied to and retained at the major face 38 of the backing construction web 24 in an "upright" position as generally reflected by an exemplary coated abrasive article 270 in FIG. 11A (i.e., one of the side faces 256-260 of each of the abrasive particles 250 bears against or is embedded into the backing construction major face 38, with the abrasive particle 250 having an overall "tipped" or "leaning" arrangements and covered with the size coat 42). With additional reference to FIGS. 2A-2C and 10A-10C, the distribution tool 50 can be configured to grossly bias the abrasive particles 250 to the desired upright, tilted orientation by forming the slot width $W_S$ to be less than the particle maximum length and height $L_{P2}$, $H_{P2}$, and greater than the maximum thickness $T_{P2}$ commensurate with the descriptions above. In some embodiments, the slot width $W_S$ is sufficiently large so that the abrasive particles 250 can freely assume the tipped or leaning arrangement, such as by being 50%-75% of the particle maximum height $H_{P2}$.

In other embodiments, the slot width $W_S$ can be more precisely calculated as based on geometry of the abrasive particle 250. With constructions in which the abrasive particle 250 has a uniform equilateral triangular tapered prism shape, the side edge dimensions of the first and second major faces 252, 254 can be measured or are known (and serve as the "length" dimension), as are the draft angle $\alpha$ and the base angle $\beta$. Due to the equilateral triangular shape and the known/measured length dimension, the height $H_{minor}$ of the first major face 252 can be calculated as:

$$H_{minor}=3^{1/2}/2 \times X_{minor}$$

Alternatively, the height $H_{minor}$ of the first major face 252 can be measured. With the particle thickness $T_{P2}$ being known or measured, a width $W_{SF}$ of any side face 256-260 is then calculated as:

$$W_{SF}=T_{P2}/\sin \beta$$

Figure 11B:
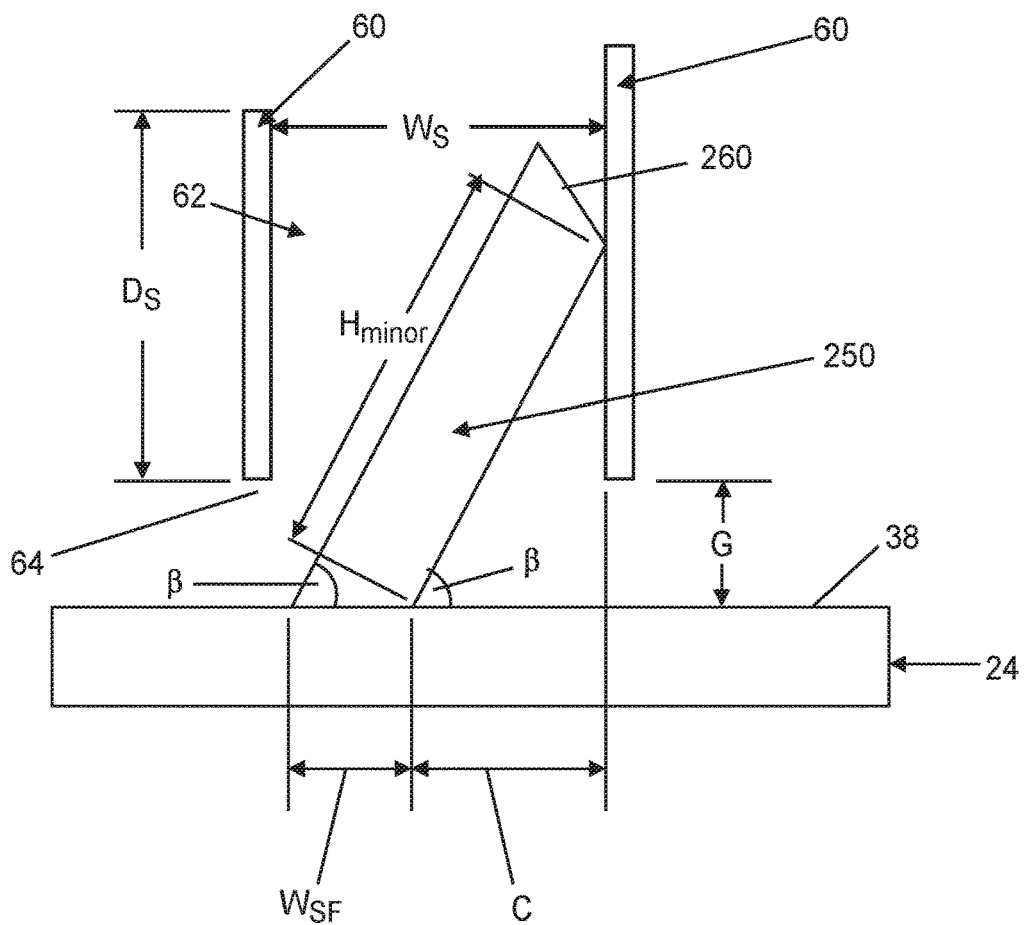

With reference to FIG. 11B, the slot width $W_S$ can then be determined as a function of the side face width $W_{SF}$. In particular, in order to accommodate the footprint of the abrasive particle 250 in the tipped orientation (in which one of the side faces 256-260 is substantially parallel with the major face 38 of the backing construction web 24 and thus substantially perpendicular to the plane of each of the walls 60), the slot width $W_S$ must be equal to or greater than the side face width $W_{SF}$ plus a clearance dimension (designated as "C" in FIG. 11B). The clearance dimension C can be calculated as:

$$C=H_{minor} \times \cos \beta$$

Thus, the slot width $W_S$ can be calculated as:

$$W_S \geq W_{SF}+C, \text{ or}$$

$$W_S \geq T_{P2}/\sin \beta + (H_{minor}) \times \cos \beta$$

As with previous embodiments, the slot depth $D_S$ is selected to approximate or be greater than the particle maximum height $H_{P2}$ (FIGS. 10A-10C) so as to better ensure that individual ones of the abrasive particles 250 attain the desired gross biased orientation and are supported in this orientation as they traverse the corresponding slot 62. Dimensions of the abrasive particles 250 can also be utilized to determine a size of the gap G between the lower side 64 of the distribution tool 50 and the backing construction web 24. In particular, the gap G is sized so as to ensure that once in contact with the backing construction web 24, a portion of the abrasive particle 250 remains "within" the corresponding slot 62, supported by at least one of the corresponding walls 60. In some embodiments, the size of the gap G is 50-75% of the maximum height $H_{P2}$.

Figure 12A:
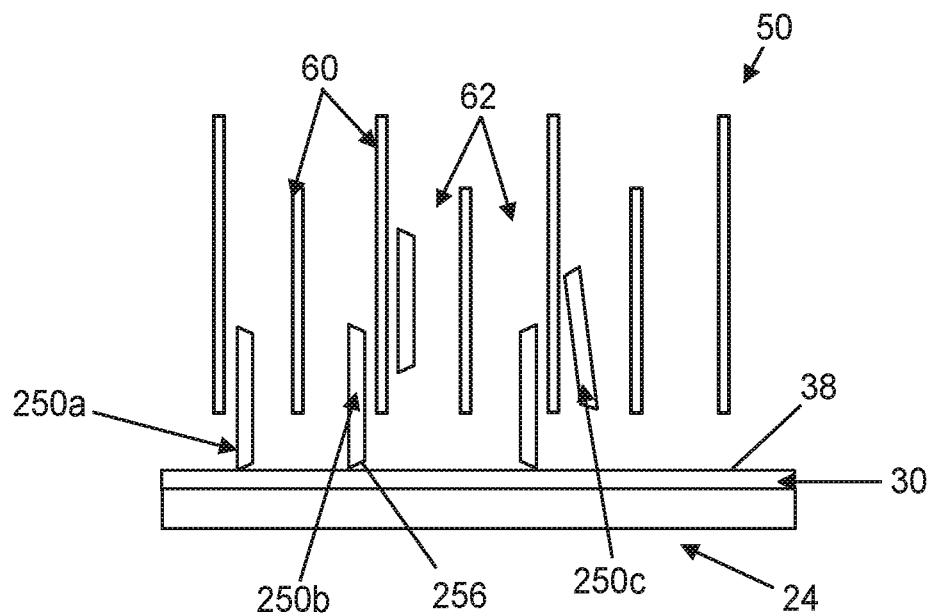
FIGS. 12A and 12B are end views of the distribution tool of FIG. 2A interacting with the abrasive particle of FIG. 10A as part of a system for manufacturing abrasive articles.
Figure 12B:
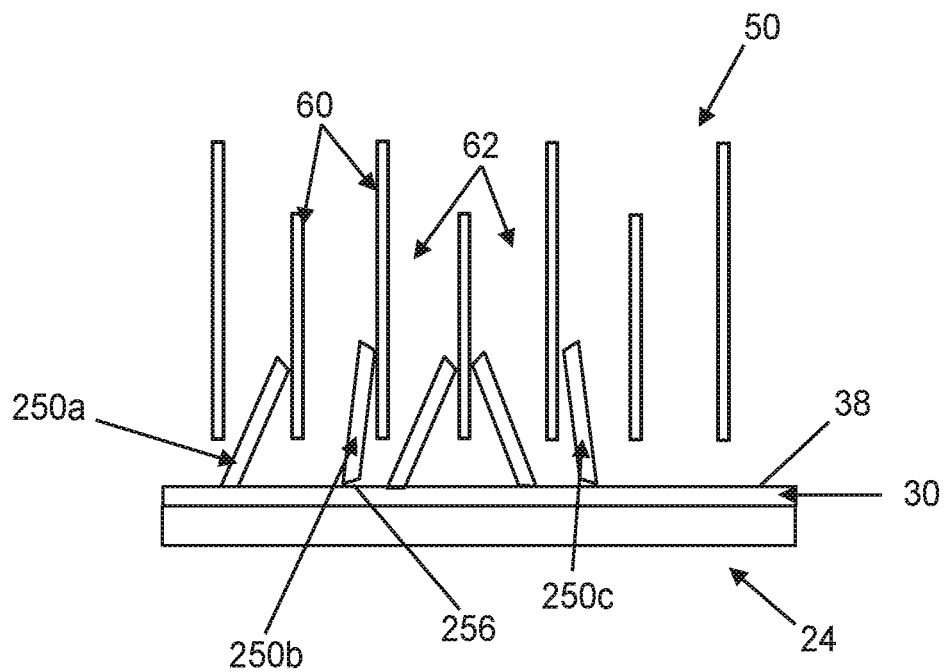

Use of the distribution tool 50 in applying a plurality of the abrasive particles 250 is highly akin to the descriptions above. In some embodiments, the distribution tool 50 is configured and arranged so that regardless of the particle $Y_P$, $Z_P$ axes (FIG. 4) rotational orientation of the abrasive particle 250 as it passes along the corresponding slot 62, the abrasive particle 250 is permitted to self-revert toward the "tilted" orientation, with one or more of the walls 60 supporting the abrasive particle in this tilted orientation. For example, the view of FIG. 12A represents various ones of the abrasive particles 250 falling through various ones of the slots 62 at a first point in time. A first one of the abrasive particles 250a is shown has having contacted the major face 38 of the backing construction web 24 at a rotational orientation in which none of the side faces 256-260 are parallel with the major face 38. In other words, while the first abrasive particle 250a has attained the gross biased orientation referenced above sufficient for passing into and partially through the slot 62, the abrasive particle 250a is not in the desired tilted orientation. Once in contact with the backing construction web 24, the abrasive particle 250a becomes at least partially secured to the make coat 30; however, a surface tension of the make coat 30 and other parameters allow the abrasive particle 250a to naturally tip. FIG. 12B reflects this phenomena, illustrating the arrangement of FIG. 12A at a later point in time. More particularly, the abrasive particle 250a has self-reverted toward the desired "tipped" orientation, and is supported in this tipped arrangement via contact with one of the walls 60.

As a point of reference, as the abrasive particles 250 randomly fall through the corresponding slots 62, each one of the abrasive particles 250 will not necessarily be spatially located to achieve the final or complete tipped arrangement. For example, a second abrasive particle 250b is identified in FIGS. 12A and 12B. In the state of FIG. 12A, the second abrasive particle 250b is dropping through the slot 62b in relatively close proximity to the wall 60. The second abrasive particle 250b contacts the major face 38 of the backing construction web 24 (FIG. 12A), and then self-tips to the arrangement of FIG. 12B. As shown, the second abrasive particle 250b comes into contact with the wall 60 prior to achieving the fully tipped arrangement (i.e., the side face 256 is not parallel with the major face 38). However, upon later exiting the distribution tool 50 (i.e., the second abrasive article 250b is no longer in contact with any of the walls 60), the make coat 30 remains sufficiently fluid such that the second abrasive particle 250b is likely to self-transition to the desired tipped arrangement.

FIGS. 12A and 12B also illustrate that with the gross biased orientations dictated by the distribution tools of the present disclosure, the abrasive particles 250 can randomly assume different spatial arrangements within the prescribed particle $Y_P$, $Z_P$ axes ranges. For example, a third abrasive article 250c is identified and is shown as being spatially arranged approximately 180 degrees (about the particle $Z_P$ axis) as compared to the first and second abrasive particles 250a, 250b.

Figure 13A:
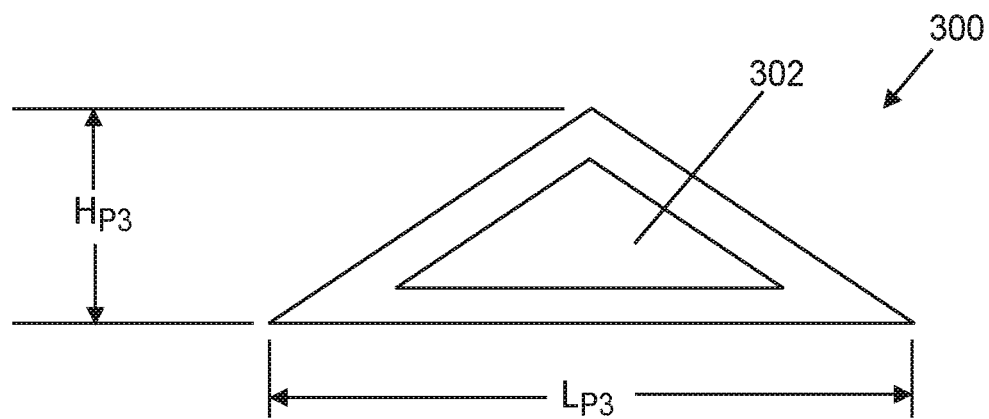
FIG. 13A is a top plan view of another abrasive particle useful with the tools, systems, and methods of the present disclosure.
Figure 13B:
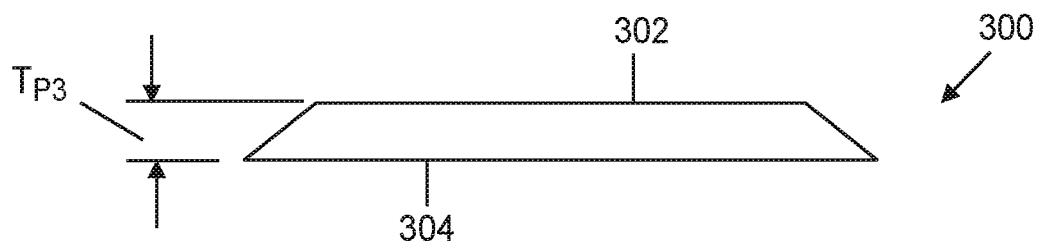
FIG. 13B is an end view of the abrasive particle of FIG. 13A.
Figure 13C:
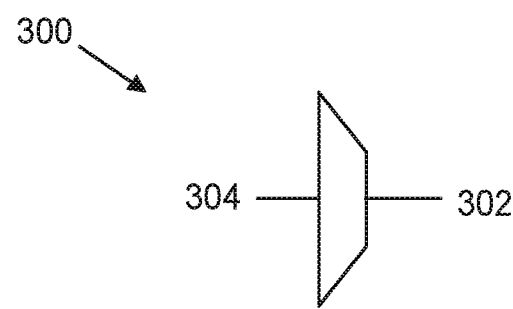
FIG. 13C is a side view of the abrasive particle of FIG. 13A.
Figure 14A:
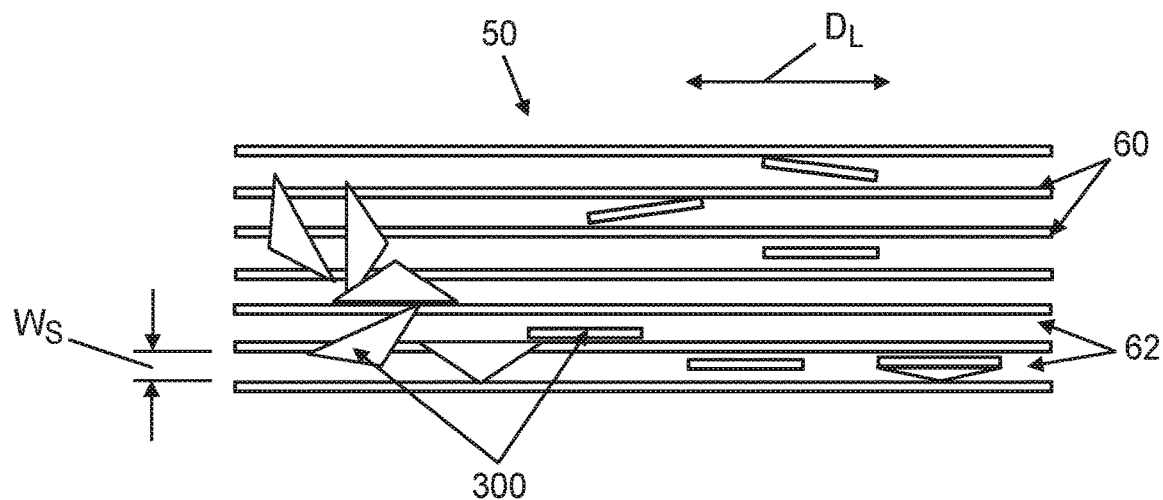
FIGS. 14A and 14B are top views of distribution tools in accordance with principles of the present disclosure interfacing with the abrasive particles of FIG. 13A.
Figure 14B:
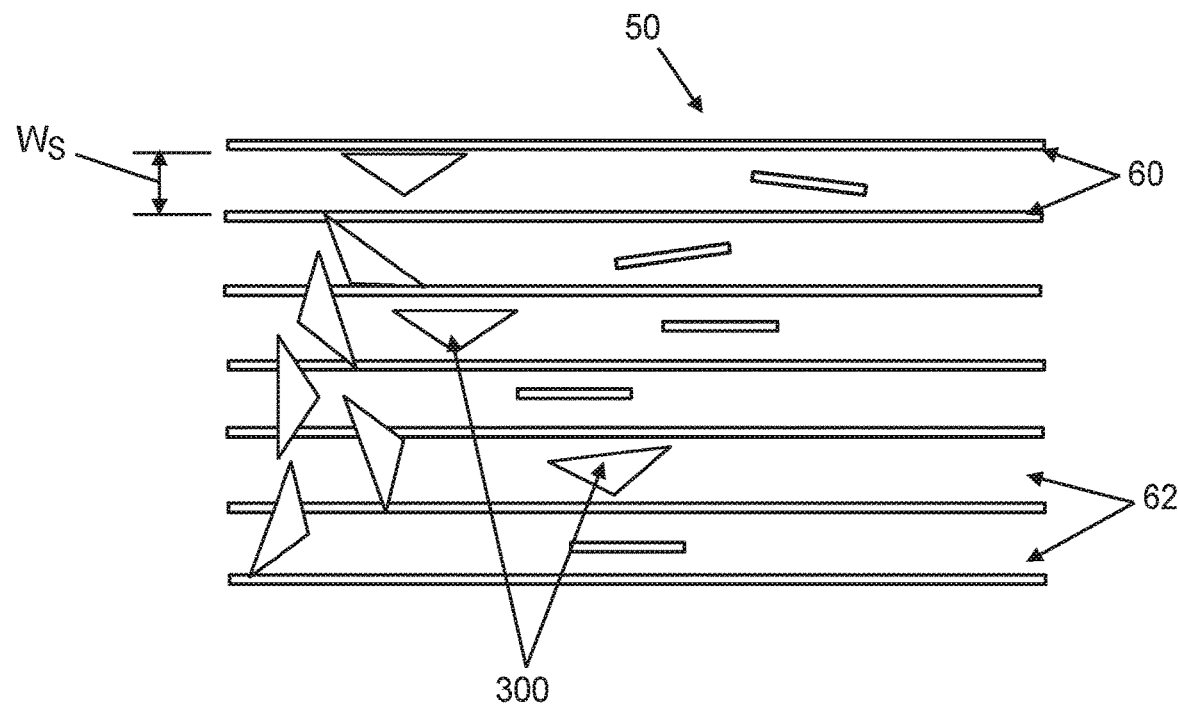

A number of other abrasive particle shapes are equally useful with the present disclosure. By way of further non-limiting example, the particle maximum length, height and thickness $L_{P3}$, $H_{P3}$, $T_{P3}$ are designated for another exemplary abrasive particle 300 shape in FIGS. 13A-13C. The shape of the abrasive particle 300 is akin to an isosceles triangular tapered prism. The maximum length $L_{P3}$ is greater than the maximum height $H_{P3}$. The tapering geometry dictates that the length and height at a first major face 302 differ from an opposing second major face 304, with the maximum length and height $L_{P3}$, $H_{P3}$ being found or measured at the second major face 304 as described above. The maximum thickness $T_{P3}$ is less than the maximum length and height $L_{P3}$, $H_{P3}$. With additional reference to FIGS. 2A-2C and commensurate with the above descriptions, the distribution tool 50 can be configured such that the slot width $W_S$ is less than the particle maximum length $L_{P3}$, optionally less than the particle maximum height $H_{P3}$, but is greater than the particle maximum thickness $T_{P3}$. For example, the view of FIG. 14A illustrates one construction in which the slot width $W_S$ is less than the maximum height $H_{P3}$ (and thus less than the maximum length $L_{P3}$). As a result, the abrasive particles 300 cannot enter any of the slots 62 whenever spatially arranged such that the maximum length $L_{P3}$ or the maximum height $H_{P3}$ is perpendicular to the length direction $D_L$. Alternatively, there may be circumstances where the abrasive article manufacturer is comfortable with a wider range of abrasive particle orientations. Thus, and as reflected by FIG. 14B, the slot width $W_S$ can be selected to be less than the particle maximum length $L_{P3}$ but greater than the particle maximum height $H_{P3}$, permitting the abrasive particles 300 to more readily attain a spatial orientation appropriate for entering one of the slots 62.

As evidenced by the above explanations, the distribution tools of the present disclosure are useful with a plethora of abrasive particle shapes, such as any precision shaped grain currently available or in the future developed. Non-limiting examples of other precision shaped grains or abrasive particles useful with the present disclosure include those described in U.S. Patent Application Publication No. 2009/0169816 entitled "Shaped, Fractured Abrasive Particle, Abrasive Article Using Same and Method of Making"; U.S. Patent Application Publication No. 2010/0146867 entitled "Shaped Abrasive Particles With Grooves"; U.S. Patent Application Publication No. 2010/0319269 entitled "Shaped Abrasive Particles With Low Roundness Factor"; U.S. Patent Application Publication No. 2012/0227333 entitled "Dual Tapered Shaped Abrasive Particles"; U.S. Patent Application Publication No. 2013/0040537 entitled "Ceramic Shaped Abrasive Particles, Methods of Making the Same, and Abrasive Articles Containing the Same"; and U.S. Patent Application Publication No. 2013/0125477 entitled "Intersecting Plate Shaped Abrasive Particles"; the entire teachings of each of which are incorporated herein by reference.

Figure 15A:
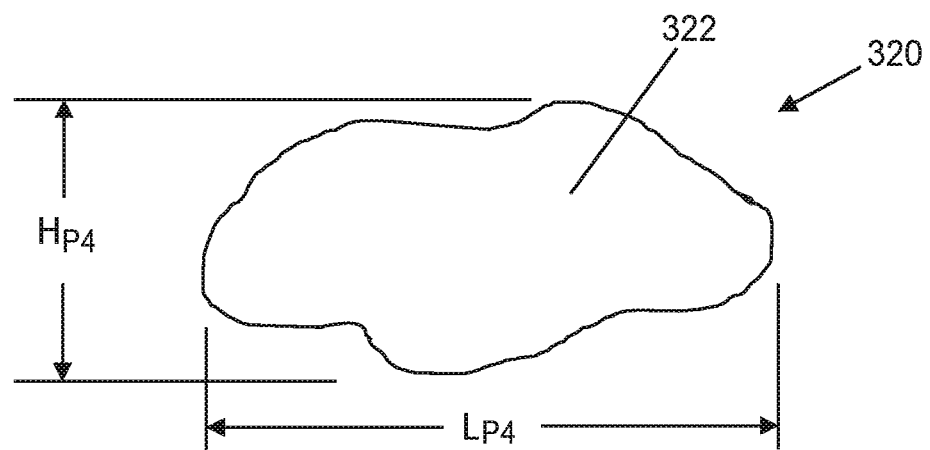
FIG. 15A is a top plan view of another abrasive particle useful with the tools, systems, and methods of the present disclosure.
Figure 15B:
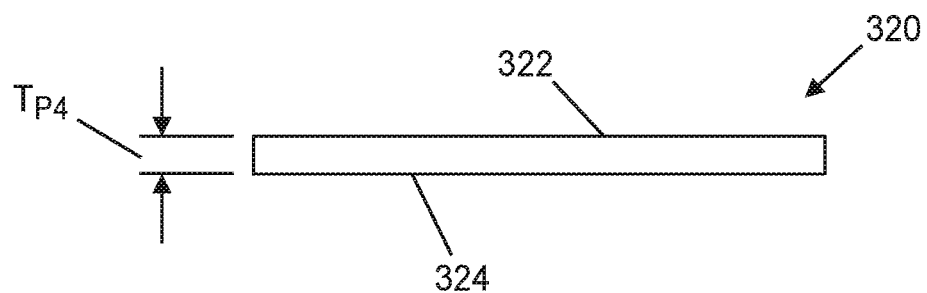
FIG. 15B is an end view of the abrasive particle of FIG. 15A.
Figure 15C:
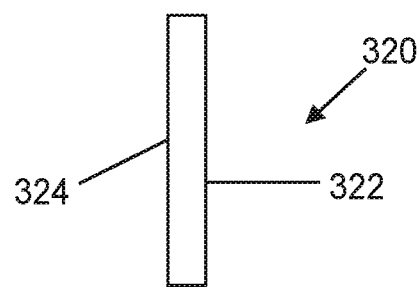
FIG. 15C is a side view of the abrasive particle of FIG. 15A.

In addition, the tools, systems and methods of the present disclosure are also useful with more abstract or complex abrasive particle shapes (e.g., shards). For example, the particle maximum length, height and thickness $L_{P4}$, $H_{P4}$, $T_{P4}$ are designated for another exemplary abrasive particle 320 shape in FIGS. 15A-15C. The shape of the abrasive particle 320 is akin to a complex prism in which opposing faces 322, 324 have a random, complex shape. The particle maximum length $L_{P4}$ is greater than the particle maximum height $H_{P4}$. The particle maximum thickness $T_{P4}$ is less than the particle maximum length and height $L_{P4}$, $H_{P4}$. With additional reference to FIGS. 2A-2C and commensurate with the above descriptions, the distribution tool 50 can be configured such that the slot width $W_S$ is less than the maximum length $L_{P4}$, optionally less than the maximum height $H_{P4}$, but is greater than the maximum thickness $T_{P4}$.

Regardless of shape, the tools, systems and methods of the present disclosure are useful with a wide range of abrasive particle materials. Exemplary useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and blends thereof. The abrasive particles may be in the form of, for example, individual particles, agglomerates, abrasive composite particles, and mixtures thereof.

Returning to FIG. 1, apart from the distribution tool 50 (and other optional components of the distribution device 22) and use thereof, other features of the abrasive article manufacturing systems and methods of the present disclosure can assume a wide variety of forms as are known in the art.

For example, the backing 28 can be a flexible backing. Suitable flexible backings include polymeric films, metal foils, knitted fabrics, paper, vulcanized fiber, nonwovens, foams, screens, laminates, and combinations thereof. The coated abrasive articles with a flexible backing may be in the form of sheets, discs, belts, pads, or rolls. In some embodiments, the backing 28 can be sufficiently flexible to allow the coated abrasive article to be formed into a loop to make an abrasive belt that can be run on suitable grinding equipment.

The make coat 30 and, where provided, the size coat 42 comprise a resinous adhesive. The resinous adhesive of the make coat 30 can be the same as or different from that of the size coat 42. Examples of resinous adhesives that are suitable for these coats include phenolic resins, epoxy resins, urea-formaldehyde resins, acrylate resins, aminoplast resins, melamine resins, acrylated epoxy resins, urethane resins and combinations thereof. In addition to the resinous adhesive, the make coat 30 or size coat 42, or both coats, may further comprise additives that are known in the art, such as, for example, fillers, grinding agents, wetting agents, surfactants, dyes, pigments, coupling agents, adhesion promoters, and combinations thereof. Examples of fillers include calcium carbonate, silica, talc, clay, calcium metasailicate, dolomite, aluminum sulfate and combinations thereof.

The distribution tools and corresponding abrasive article manufacturing systems and methods of the present disclosure provide a marked improvement over previous designs. Abrasive particles are randomly loaded on to the distribution tool. In passing through the distribution tool and becoming applied to a backing, the abrasive particles are caused to become grossly oriented and aligned, with minimal costs and restrictions on through put time. Further, the distribution tool supports the oriented and aligned abrasive particles for a dwell period, enhancing the likelihood that the abrasive particles will retain the biased orientation. The distribution tools of the present disclosure are useful with any type or shape of abrasive particle, especially abrasive particles that are not well-suited for electrostatic coating.

Although the present disclosure has been described with reference to preferred embodiments, workers skilled in the art will recognize that changes can be made in form and detail without departing from the spirit and scope of the present disclosure.

What is claimed is:

1. A method for making an abrasive article comprising:
   loading abrasive particles to a distribution tool, the distribution tool including a plurality of walls defining a plurality of slots, each of the plurality of slots being open to a lower side of the distribution tool; and
   distributing abrasive particles from the distribution tool on to a major face of a backing construction web located immediately below the lower side of the distribution tool and moving relative to the distribution tool;
   wherein at least a majority of the abrasive particles distributed from the distribution tool undergo a particle orientation sequence in which each abrasive particle of the at least a majority of abrasive particles:
   a) enters one of the plurality of slots,
   b) passes partially through the corresponding slot such that a first portion of the abrasive particle is beyond the lower side and in contact with the major face, and a second portion of the abrasive particle is within the slot,
   c) remains in simultaneous contact with at least one of the walls and the major face for a dwell period during which the web moves relative to the distribution tool.

2. The method of claim 1, wherein the step of distributing abrasive particles includes a plurality of the abrasive particles simultaneously within a respective one of the slots.

3. The method of claim 1, wherein the step of distributing abrasive particles includes a plurality of abrasive particles simultaneously in contact with the major face and a first one of the walls as part of the corresponding orientation sequence.

4. The method of claim 1, wherein the step of distributing abrasive particles includes vibrating the distribution tool.

5. The method of claim 1, wherein each of the plurality of slots defines a length greater than a width and a depth, and further wherein the distribution tool is arranged such that a direction of the length of each of the slots is substantially parallel with a machine direction of the moving web.

6. The method of claim 5, wherein each of the slots extends in a length direction from an entrance side of the distribution tool to an exit side of the distribution tool, the entrance side being located upstream of the exit side relative to a machine direction of the moving web, and further wherein the step of loading includes directing the abrasive particles to the entrance side.

7. The method of claim 1, wherein at least 75% of the abrasive particles distributed from the distribution tool undergo the particle orientation sequence.

8. The method of claim 1, further comprising:
providing a supply of abrasive particles for loading to the distribution tool, the abrasive particles of the supply of abrasive particles having a nominal maximum length, a nominal maximum height, and a nominal maximum thickness, the nominal maximum length and the nominal maximum height being greater than the nominal maximum thickness, and further wherein a width of each of the slots is less than the nominal maximum length and the nominal maximum height.

9. The method of claim 8, wherein the width of each of the slots is greater than the nominal maximum thickness.

10. The method of claim 1, wherein the orientation sequence for at least some of the abrasive particles includes:
initially contacting the major face with a first spatial orientation; and
self-adjusting to a second spatial orientation while the first portion remains in contact with the major face and the second portion is within the confines of the corresponding slot.

11. The method of claim 10, wherein the step of self-adjusting includes the abrasive particle tilting relative to the major face due, at least in part, to gravity until the abrasive particle comes into contact with one of the walls of the corresponding slot.

12. The method of claim 1, wherein the backing construction web includes a make coat along a major surface of a backing.

13. A system for making an abrasive article comprising:
a distribution tool including a plurality of walls defining a plurality of slots, each of the slots being open to a lower side of the distribution tool; and
a web feeding device configured to manipulate a backing construction web in a machine direction immediately below the lower side of the distribution tool;
wherein each of the plurality of walls defines a first end opposite a second end, and a height between the first and second ends, wherein alternating ones of the walls have differing heights;
wherein each of the slots defines a length, a depth, and a width, the length being greater than the depth, and the depth being greater than the width;
and further wherein the distribution tool is arranged relative to the web feeding device such that for each of the slots:
the depth is substantially perpendicular to the machine direction,
the length is substantially parallel to the machine direction,
the width is substantially orthogonal to the depth and the length.

14. The system of claim 13, wherein each of the plurality of walls defines a first end opposite a second end, the walls being arranged such that the first ends are aligned at the lower side of the distribution tool.

15. The system of claim 13, wherein the plurality of walls includes a first wall, a second wall immediately adjacent the first wall, and a third wall immediately adjacent the second wall opposite the first wall, and further wherein the height of the first and second walls is greater than the height of the third wall.

16. The system of claim 13, further comprising:
a vibration device connected to the distribution tool for vibrating the distribution tool.

* * * * *